(12) United States Patent
Shinto et al.

(10) Patent No.: US 10,007,106 B2
(45) Date of Patent: Jun. 26, 2018

(54) OPTICAL FILTER, OPTICAL MODULE, ELECTRONIC APPARATUS, AND METHOD OF MANUFACTURING OPTICAL FILTER

(71) Applicant: Seiko Epson Corporation, Tokyo (JP)

(72) Inventors: Susumu Shinto, Shimosuwa (JP); Koji Kitahara, Ina (JP)

(73) Assignee: Seiko Epson Corporation (JP)

( * ) Notice: Subject to any disclaimer, the term of this patent is extended or adjusted under 35 U.S.C. 154(b) by 449 days.

(21) Appl. No.: 14/452,869

(22) Filed: Aug. 6, 2014

(65) Prior Publication Data

US 2015/0042362 A1 Feb. 12, 2015

(30) Foreign Application Priority Data

Aug. 7, 2013 (JP) ................................ 2013-163945

(51) Int. Cl.
*G02B 26/00* (2006.01)
*G01B 7/14* (2006.01)
(Continued)

(52) U.S. Cl.
CPC ............. *G02B 26/001* (2013.01); *G01B 7/14* (2013.01); *G01J 3/027* (2013.01); *G01J 3/0291* (2013.01);
(Continued)

(58) Field of Classification Search
CPC .... G02B 26/001; G02B 6/29395; G02B 5/22; G02B 6/29361; G02B 1/10; G02B 5/285;
(Continued)

(56) References Cited

U.S. PATENT DOCUMENTS 8,025,844 B2 * 9/2011 Uchiyama .......... G01N 21/7703
422/401
2010/0302660 A1 * 12/2010 Hirokubo .................. G01J 3/26
359/850
(Continued)

FOREIGN PATENT DOCUMENTS

CN 102608689 A 7/2012
EP 2410368 A1 1/2012
(Continued)

OTHER PUBLICATIONS

Extended European Search Report for Application No. EP 14 17 9822 dated Dec. 15, 2014 (5 pages).

*Primary Examiner* — Alesa Allgood
(74) *Attorney, Agent, or Firm* — Harness, Dickey & Pierce, P.L.C.

(57) ABSTRACT

An optical filter includes a stationary substrate and a movable substrate disposed so as to be opposed to each other, a first reflecting film disposed on a movable substrate side of the stationary substrate, a second reflecting film disposed on a stationary substrate side of the movable substrate, and opposed to the first reflecting film, a first protective film disposed so as to overlap the first reflecting film, and having a light transmissive property and electrical conductivity, a second protective film disposed so as to overlap the second reflecting film, and having a light transmissive property and electrical conductivity, a first terminal connected to the first protective film, and a second terminal connected to the second protective film. An electrical connection of the first terminal and the second terminal is electrically switchable.

13 Claims, 12 Drawing Sheets

(51) Int. Cl.
*G01J 3/26* (2006.01)
*G02B 5/28* (2006.01)
*G01J 3/02* (2006.01)
*G01J 3/10* (2006.01)
*G01J 3/28* (2006.01)

(52) U.S. Cl.
CPC . *G01J 3/10* (2013.01); *G01J 3/26* (2013.01); *G01J 3/2823* (2013.01); *G02B 5/284* (2013.01)

(58) Field of Classification Search
CPC .......... G02B 1/105; G02B 1/116; G02B 5/00; H01L 27/322; H01L 51/5218; H01L 51/5234; G01J 3/26; G01J 2003/1247; G01J 1/04
USPC .......................................... 359/577, 578, 585
See application file for complete search history.

(56) References Cited

U.S. PATENT DOCUMENTS

| | | |
|---|---|---|
| 2012/0019812 A1 | 1/2012 | Shinto et al. |
| 2012/0050742 A1 | 3/2012 | Sano |
| 2012/0133947 A1 | 5/2012 | Nozawa |
| 2012/0188646 A1 | 7/2012 | Sano et al. |
| 2012/0257280 A1 | 10/2012 | Sano et al. |
| 2012/0300208 A1 | 11/2012 | Sano et al. |
| 2013/0021313 A1* | 1/2013 | Govil .................. G02B 26/001 345/212 |
| 2013/0038641 A1 | 2/2013 | Muneyoshi |
| 2013/0083399 A1 | 4/2013 | Hirokubo et al. |
| 2013/0214123 A1 | 8/2013 | Shinto |

FOREIGN PATENT DOCUMENTS

| | | | |
|---|---|---|---|
| JP | 2002-277758 A | 9/2002 | |
| JP | 2008-094063 | * 10/2006 | ............... B32B 9/00 |
| JP | 2011-008225 A | 1/2011 | |
| JP | 2012-027224 | 2/2012 | |
| JP | 2012-047890 A | 3/2012 | |
| JP | 2012-173315 A | 9/2012 | |
| JP | 2012-173348 A | 9/2012 | |
| JP | 2012-220765 A | 11/2012 | |
| JP | 2012-247472 A | 12/2012 | |
| JP | 2013-037293 A | 2/2013 | |
| JP | 2013-167789 A | 8/2013 | |

* cited by examiner

OPTICAL FILTER, OPTICAL MODULE, ELECTRONIC APPARATUS, AND METHOD OF MANUFACTURING OPTICAL FILTER

BACKGROUND

1. Technical Field

The present invention is related to an optical filter, an optical module, an electronic apparatus, and a method of manufacturing an optical filter.

2. Related Art

In the past, an optical filter has been utilized for selectively emitting light with a specific wavelength out of the incident light. Further, an optical filter for emitting light with a specific wavelength is disclosed in JP-A-2012-27224. According to JP-A-2012-27224, the optical filter has a pair of substrates opposed to each other, and reflecting films disposed on respective surfaces opposed to each other of these substrates. The optical filter has a structure having electrodes respectively disposed in the peripheries of these reflecting films, and at the same time having a diaphragm section disposed in the periphery of the reflecting film.

The optical filter is capable of selectively taking out light with a wavelength corresponding to a dimension of a gap between the pair of reflecting films opposed to each other. The gap between the reflecting films can be controlled to be a desired value (distance) using electrostatic drive by applying a voltage between a stationary electrode disposed on one of the substrates and a movable electrode disposed on the other of the substrates.

Optical filters can also be utilized in air containing moisture. Water molecules repeatedly collide with each other to become charged while moving in the air. When the water molecules thus charged adhere to the reflecting films, the reflecting films become charged. Then, a voltage difference occurs between the reflecting films opposed to each other, and thus an electrostatic force acts between the reflecting films. Thus, the distance between the reflecting films opposed to each other varies. Since the distance between the reflecting films affects the wavelength of the light to be transmitted through the optical filter, the wavelength of the light to be transmitted through the optical filter fluctuates if the distance between the reflecting films fluctuates. Therefore, there has been demanded an optical filter hardly fluctuating in the wavelength of the light to be transmitted through the optical filter, and a method of manufacturing such an optical filter with high productivity.

SUMMARY

An advantage of some aspects of the invention is to solve the problems described above, and the invention can be implemented as the following forms or application examples.

APPLICATION EXAMPLE 1

This application example is directed to an optical filter including a first reflecting film, a second reflecting film opposed to the first reflecting film, a first conductive film disposed on a surface of the first reflecting film, the surface being opposed to the second reflecting film, in an overlapping manner, and having a light transmissive property and an electrical conductivity, a second conductive film disposed on a surface of the second reflecting film, the surface being opposed to the first reflecting film, in an overlapping manner, and having a light transmissive property and an electrical conductivity, and a first terminal connected to the first conductive film, and a second terminal connected to the second conductive film, and a connection of the first terminal and the second terminal is electrically switchable.

According to this application example, the optical filter is provided with the first reflecting film and the second reflecting film, and the first reflecting film and the second reflecting film are disposed so as to be opposed to each other. The first reflecting film and the second reflecting film each partially reflect the incident light, and partially transmit the incident light. Multiple reflection of the light occurs between the first reflecting film and the second reflecting film, and the light in phase is transmitted and proceeds in the proceeding direction of the incident light. The first conductive film is disposed so as to overlap the first reflecting film, and the second conductive film is disposed so as to overlap the second reflecting film. The temporal change of each of the reflecting films is suppressed due to the conductive films.

The first conductive film and the second conductive film each have an electrical conductivity. Further, the first terminal is connected to the first conductive film, and the second terminal is connected to the second conductive film. Further, the connection of the first terminal and the second terminal is electrically switchable. In some cases, moisture adheres to the first conductive film and the second conductive film to thereby charge the first conductive film and the second conductive film. On this occasion, when a potential difference occurs between the first conductive film and the second conductive film, the electrostatic force acts between the first conductive film and the second conductive film. The distance between the first reflecting film and the second reflecting film varies due to the electrostatic force. On this occasion, by shorting the first conductive film and the second conductive film, the potential difference between the first conductive film and the second conductive film vanishes. Therefore, since the electrostatic force no longer acts between the first conductive film and the second conductive film, the distance between the first reflecting film and the second reflecting film can be maintained with high accuracy. As a result, it is possible to prevent the wavelength of the light to be transmitted through the optical filter from varying.

APPLICATION EXAMPLE 2

This application example is directed to the optical filter according to the application example described above, wherein the first reflecting film and the second reflecting film are each a film including silver, and at least one of the first conductive film and the second conductive film is a film consisting primarily of InGaO.

According to this application example, the first reflecting film and the second reflecting film are each a film including silver, and are each a film high in reflectance. Further, the first conductive film and the second conductive film are each a film consisting primarily of InGaO. Since InGaO resists reacting with silver, the deterioration of the first reflecting film and the second reflecting film can be suppressed.

APPLICATION EXAMPLE 3

This application example is directed to the optical filter according to the application example described above, wherein at least one of the first reflecting film and the second reflecting film has a side surface exposed.

According to this application example, the side surfaces of the first reflecting film and the second reflecting film are exposed. In other words, the side surface of the first reflecting film is not covered with the first conductive film, and the side surface of the second reflecting film is not covered with the second conductive film. The shapes of the first reflecting film and the first conductive film are formed by stacking a solid film made of the material of the first reflecting film and a solid film made of the material of the first conductive film on each other, and then patterning the result. Therefore, the number of processes can be decreased compared to the case of patterning the first reflecting film and then patterning the first conductive film. The configurations of the second reflecting film and the second conductive film are substantially the same as the configurations of the first reflecting film and the first conductive film. Therefore, the number of processes can be decreased compared to the case of patterning the second reflecting film and then patterning the second conductive film. As a result, the optical filter can be manufactured with high productivity.

APPLICATION EXAMPLE 4

This application example is directed to the optical filter according to the application example described above, wherein a capacitance between the first conductive film and the second conductive film is detected using the first terminal and the second terminal.

According to this application example, the first terminal is connected to the first conductive film, and the second terminal is connected to the second conductive film. Further, the capacitance between the first conductive film and the second conductive film is detected using the first terminal and the second terminal. The capacitance and the distance between the first conductive film and the second conductive film are negatively correlated with each other. Therefore, by detecting the capacitance, the distance between the first conductive film and the second conductive film can be detected. By subtracting the film thicknesses of the first conductive film and the second conductive film from the distance between the first conductive film and the second conductive film, the distance between the first reflecting film and the second reflecting film is calculated. As a result, the distance between the first reflecting film and the second reflecting film can be detected.

APPLICATION EXAMPLE 5

This application example is directed to the optical filter according to the application example described above, wherein the first reflecting film and the second reflecting film are provided with an effective range irradiated with light, and an auxiliary range not irradiated with the light and disposed in a place surrounding the effective range.

According to this application example, the first reflecting film and the second reflecting film are provided with the effective range and the auxiliary range. The effective range is a range irradiated with the light, and the auxiliary range is a range not irradiated with the light. The auxiliary range is disposed so as to surround the effective range. The side surfaces of the first reflecting film and the second reflecting film are exposed, and there is a possibility that the reflectance is deteriorated. On this occasion, the deterioration of the reflectance occurs in the auxiliary range, and the effective range is distant from the side surface, and therefore resists being deteriorated in reflectance. Therefore, the long-term reliability of the reflectance of the optical filter can be raised.

APPLICATION EXAMPLE 6

This application example is directed to an optical module including a first reflecting film, a second reflecting film opposed to the first reflecting film, a first conductive film disposed on a surface of the first reflecting film, the surface being opposed to the second reflecting film, in an overlapping manner, and having a light transmissive property and an electrical conductivity, a second conductive film disposed on a surface of the second reflecting film, the surface being opposed to the first reflecting film, in an overlapping manner, and having a light transmissive property and an electrical conductivity, and an electric switch section adapted to electrically switch a connection of the first conductive film and the second conductive film.

According to this application example, the first substrate and the second substrate are disposed so as to be opposed to each other. The first reflecting film is disposed on the second substrate side of the first substrate, and the second reflecting film is disposed on the first substrate side of the second substrate. Thus, the first reflecting film and the second reflecting film are disposed so as to be opposed to each other. The first reflecting film and the second reflecting film each partially reflect the incident light, and partially transmit the incident light. Multiple reflection of the light occurs between the first reflecting film and the second reflecting film, and the light in phase is transmitted and proceeds in the proceeding direction of the incident light. The first conductive film is disposed so as to overlap the first reflecting film, and the second conductive film is disposed so as to overlap the second reflecting film. The temporal change of each of the reflecting films is suppressed due to the conductive films.

The first conductive film and the second conductive film each have an electrical conductivity. Further, the electric switch section electrically switches the connection of the first conductive film and the second conductive film. In some cases, moisture adheres to the first conductive film and the second conductive film to thereby charge the first conductive film and the second conductive film. On this occasion, when a potential difference occurs between the first conductive film and the second conductive film, the electrostatic force acts between the first conductive film and the second conductive film. The distance between the first reflecting film and the second reflecting film shortens due to the electrostatic force. On this occasion, by shorting the first conductive film and the second conductive film, the potential difference between the first conductive film and the second conductive film vanishes. Therefore, since the electrostatic force no longer acts between the first conductive film and the second conductive film, the distance between the first reflecting film and the second reflecting film can be maintained with high accuracy. As a result, it is possible to prevent the wavelength of the light to be transmitted through the optical filter from varying.

APPLICATION EXAMPLE 7

This application example is directed to the optical module according to the application example described above, which further includes a capacitance detection section adapted to detect a capacitance between the first conductive film and the second conductive film.

According to this application example, the capacitance detection section detects the capacitance between the first conductive film and the second conductive film. The capacitance and the distance between the first conductive film and the second conductive film are negatively correlated with each other. Therefore, by detecting the capacitance, the distance between the first conductive film and the second conductive film can be detected. By subtracting the film thicknesses of the first conductive film and the second conductive film from the distance between the first conductive film and the second conductive film, the distance between the first reflecting film and the second reflecting film is calculated. As a result, the distance between the first reflecting film and the second reflecting film can be detected.

APPLICATION EXAMPLE 8

This application example is directed to an electronic apparatus including an optical module including a first reflecting film, a second reflecting film opposed to the first reflecting film, a first conductive film disposed on a surface of the first reflecting film, the surface being opposed to the second reflecting film, in an overlapping manner, and having a light transmissive property and an electrical conductivity, a second conductive film disposed on a surface of the second reflecting film, the surface being opposed to the first reflecting film, in an overlapping manner, and having alight transmissive property and an electrical conductivity, and an electric switching section adapted to electrically switch a connection of the first conductive film and the second conductive film, and a control section adapted to control the optical module.

According to this application example, the electronic apparatus includes the optical module and the control section adapted to control the optical module. Since the optical module can control the gap between the first reflecting film and the second reflecting film with high accuracy, there is provided a module capable of separating the light with a specific wavelength with high accuracy. Therefore, the control section can make the light with the wavelength instructed to the optical module be accurately separated and make full use of the light with that wavelength.

APPLICATION EXAMPLE 9

This application example is directed to a method of manufacturing an optical filter including: providing a reflecting film to a substrate, forming a conductive film having a light transmissive property and an electrical conductivity so as to overlap the reflecting film, and etching the reflecting film and the conductive film after patterning a resist on the conductive film.

According to this application example, the shapes of the reflecting film and the conductive film are formed by patterning after stacking the reflecting film and the conductive film on each other. Therefore, the number of processes can be decreased compared to the case of patterning the reflecting film and then patterning the conductive film. As a result, the optical filter can be manufactured with high productivity.

BRIEF DESCRIPTION OF THE DRAWINGS

Embodiments of the invention will now be described with reference to the accompanying drawings, wherein like numbers reference like elements.

DESCRIPTION OF EXEMPLARY EMBODIMENTS

Figure 1:
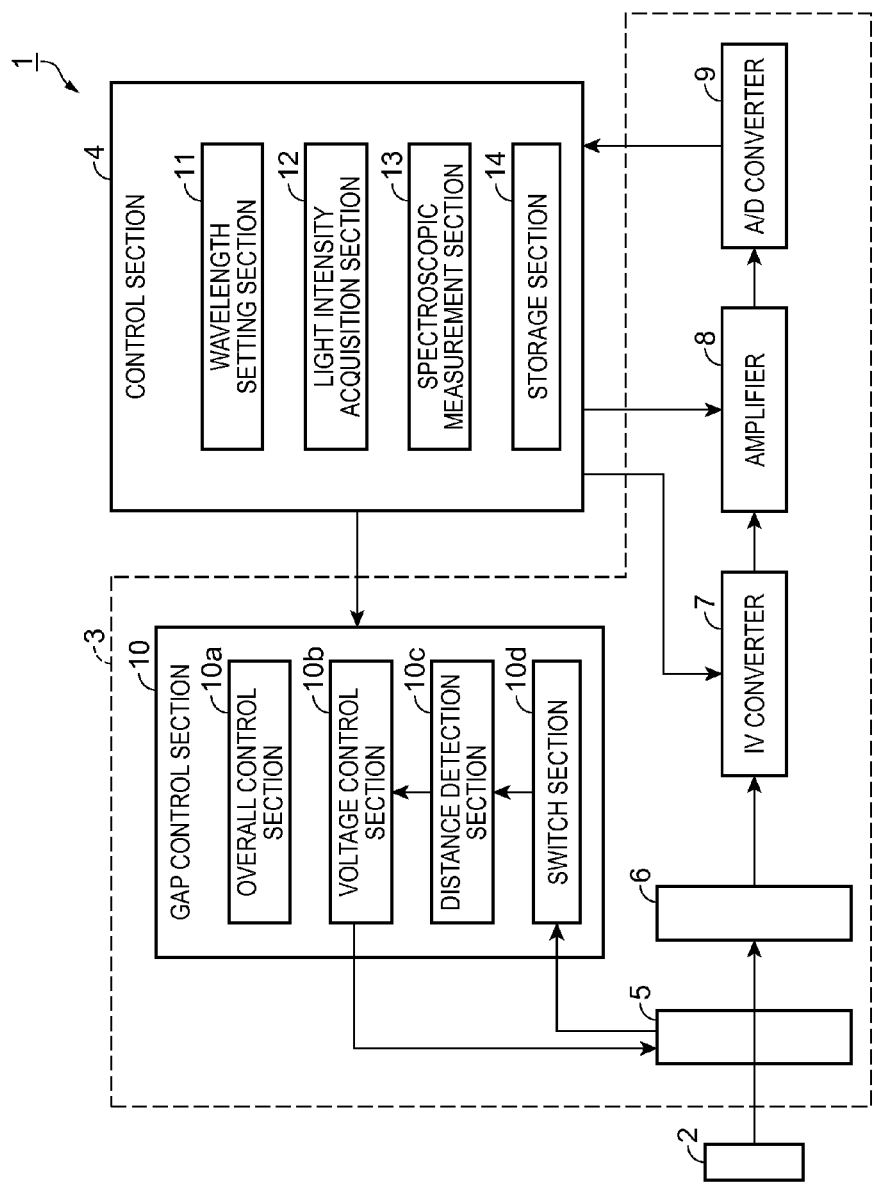
FIG. 1 is a block diagram showing a schematic configuration of a spectroscopic measurement device according to a first embodiment of the invention.

In the description of the present embodiment, examples of a distinguishing variable wavelength interference filter and a variety of devices using the distinguishing variable wavelength interference filter will be explained with FIGS. 1 through 12. Hereinafter, the embodiments will be explained along with the accompanying drawings. It should be noted that the members in each of the drawings are drawn with respective scales different from each other in order to provide sizes large enough to be recognized in the drawing.

First Embodiment

A spectroscopic measurement device according to the first embodiment will be explained along with FIGS. 1, 2A through 2C, 3A, 3B, 4, 5A through 5H, and 6A through 6F. FIG. 1 is a block diagram showing a schematic configuration of the spectroscopic measurement device. The spectroscopic measurement device 1 is an example of an electronic apparatus, and is a device for analyzing the light intensity at each of the wavelengths of measurement target light having been reflected by a measurement object 2 to thereby measure the dispersion spectrum. It should be noted that the spectroscopic measurement device 1 measures the measurement target light having been reflected by the measurement object 2. In the case of a light emitting body such as a liquid crystal panel, it is also possible to measure the light emitted from the measurement object 2.

As shown in FIG. 1, the spectroscopic measurement device 1 is provided with an optical module 3, and a control section 4 for processing a signal output from the optical module 3. The optical module 3 is provided with a variable wavelength interference filter 5 as an optical filter, a detector 6, an I-V converter 7, an amplifier 8, an A/D converter 9, and a gap control section 10. The optical module 3 guides the measurement target light reflected by the measurement object 2 to the variable wavelength interference filter 5 through an incident optical system (not shown), and then receives the light, which has been transmitted through the variable wavelength interference filter 5, using the detector 6. Then, a detection signal output from the detector 6 is output to the control section 4 via the I-V converter 7, the amplifier 8, and the A/D converter 9.

The detector 6 receives (detects) the light transmitted through the variable wavelength interference filter 5, and then outputs a detection signal based on the received light intensity to the I-V converter 7. The I-V converter 7 converts the detection signal input from the detector 6 into a voltage value, and then outputs the voltage value to the amplifier 8. The amplifier 8 amplifies the voltage value (the detected voltage), which corresponds to the detection signal, and is input from the I-V converter 7. The A/D converter 9 converts the detected voltage (an analog signal) input from the amplifier 8 into a digital signal, and then outputs the digital signal to the control section 4.

The gap control section 10 is a region for controlling the wavelength of the light transmitted by the variable wavelength interference filter 5. The gap control section 10 is provided with an overall control section 10a, a voltage control section 10b, a distance detection section 10c as a capacitance detection section, and a switch section 10d as an electric switching section. The overall control section 10a controls the voltage control section 10b, the distance detection section 10c, and switch section 10d based on the control instruction signal of the control section 4. The voltage control section 10b applies a drive voltage to the variable wavelength interference filter 5 based on an instruction signal of the overall control section 10a. The distance detection section 10c detects the distance between a first reflecting film and a second reflecting film incorporated in the variable wavelength interference filter 5. The switch section 10d switches whether wiring lines connected to the first reflecting film and the second reflecting film are grounded or connected to the distance detection section 10c.

The control section 4 is a constituent having a CPU, a memory, and so on combined with each other, and controls an overall operation of the spectroscopic measurement device 1. The control section 4 is provided with a wavelength setting section 11, a light intensity acquisition section 12, a spectroscopic measurement section 13, and a storage section 14. The storage section 14 of the control section 4 stores V-λ data representing a relationship between the wavelength of the light to be transmitted through the variable wavelength interference filter 5, and the drive voltage to be applied to the variable wavelength interference filter 5 in accordance with the wavelength.

The wavelength setting section 11 sets a specific wavelength of the light to be taken out by the variable wavelength interference filter 5. Based on the V-λ data, an instruction signal for applying the drive voltage corresponding to the target wavelength thus set to the variable wavelength interference filter 5 is output to the gap control section 10. The light intensity acquisition section 12 obtains the light intensity of the light with the specific wavelength transmitted through the variable wavelength interference filter 5 based on the light intensity obtained by the detector 6. The spectroscopic measurement section 13 measures the spectrum characteristics of the measurement target light based on the light intensity obtained by the light intensity acquisition section 12.

Figure 2A:
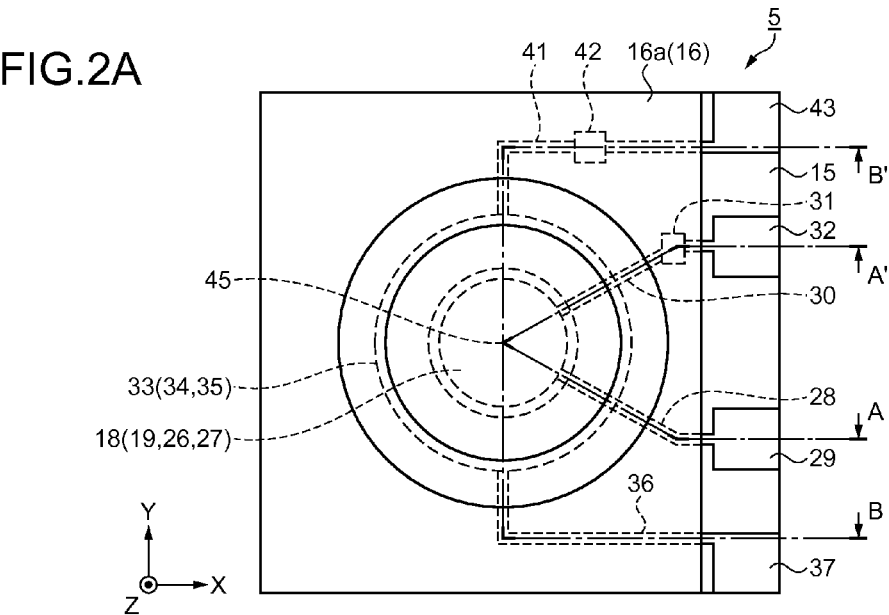
FIG. 2A is a schematic plan view showing a configuration of a variable wavelength interference filter.
Figure 2B:
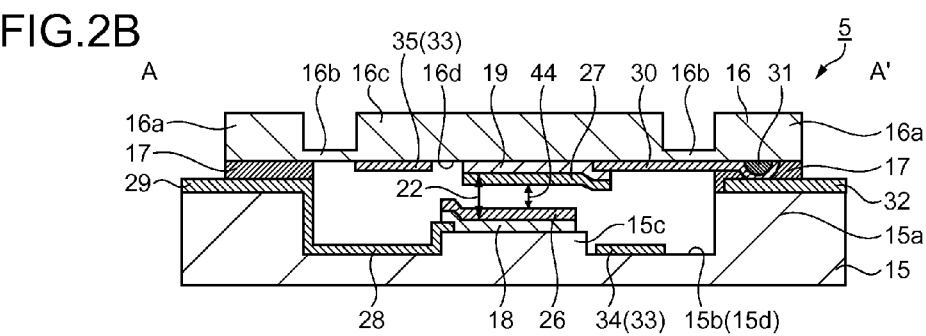
FIGS. 2B and 2C are schematic side cross-sectional views showing the configuration of the variable wavelength interference filter.
Figure 2C:
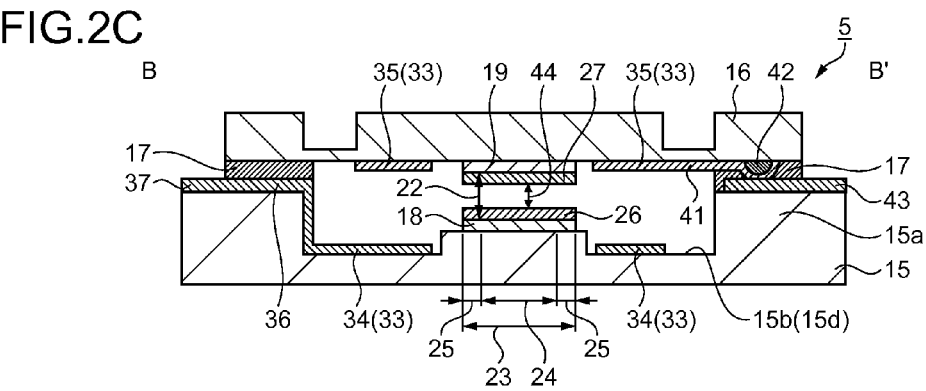

Next, the variable wavelength interference filter to be incorporated in the optical module 3 will be explained. FIG. 2A is a schematic plan view showing a configuration of the variable wavelength interference filter. FIGS. 2B and 2C are schematic side cross-sectional views showing the configuration of the variable wavelength interference filter. FIG. 2B is a cross-sectional view in a cross section along the A-A' line in FIG. 2A, and FIG. 2C is a cross-sectional view in a cross section along the B-B' line in FIG. 2A. As shown in FIGS. 2A through 2C, the variable wavelength interference filter 5 is provided with a stationary substrate 15 as a first substrate and a movable substrate 16 as a second substrate. The stationary substrate 16 and the movable substrate 16 each have a quadrangular plate-like shape, and the movable substrate 16 is smaller than the stationary substrate 15 in shape in a plan view viewed from a thickness direction of the substrates. Further, the movable substrate 16 is disposed above the stationary substrate 15 in an overlapping manner. The stationary substrate 15 and the movable substrate 16 are each made of a variety of types of glass such as soda glass, crystalline glass, quartz glass, lead glass, potassium glass, borosilicate glass, or alkali-free glass, or a quartz crystal, for example. Further, the stationary substrate 15 and the movable substrate 16 are integrally constituted by bonding a first bonding section 15a of the stationary substrate 15 and a second bonding section 16a of the movable substrate 16 to each other with a bonding film 17 formed of, for example, a plasma-polymerized film consisting primarily of siloxane.

In the stationary substrate 15, a recessed section 15b having a ring-like shape is disposed in a surface of the side opposed to the movable substrate 16. The recessed section 15b is located at the center of the stationary substrate 15. Further, a mirror stage section 15c having a columnar shape is disposed at the center of the recessed section 15b, and a first reflecting film 18 as the reflecting film is disposed on the mirror stage section 15c. In the movable substrate 16, a second reflecting film 19 as the reflecting film and a second reflecting film is disposed on the surface of the side opposed to the stationary substrate 15.

The movable substrate 16 is provided with a recessed section having a ring-like groove shape, wherein a bottom part of the recessed section is referred to as a connection section 16b. The center of the movable substrate 16 forms a movable section 16c having the same thickness as that of the second bonding section 16a. The connection section 16b connects the second bonding section 16a and the movable section 16c to each other. The connection section 16b is reduced in thickness to have elasticity. The movable section 16c is arranged to be movable in the thickness direction of the movable substrate 16 due to a deflection of the connection section 16b. Thus, the surface of the movable section 16c facing to the first reflecting film 18 forms a movable surface 16d moving in the thickness direction of the movable substrate 16. The first reflecting film 18 and the second reflecting film 19 are disposed so as to be opposed to each other via a gap 22.

In a plan view of the stationary substrate 15 and the movable substrate 16 viewed from the thickness direction thereof, the region where the first reflecting film 18 and the second reflecting film 19 overlap each other is referred to as an optical interference region 23. An effective range 24 having a circular shape is disposed at the center of the optical interference region 23, and an auxiliary range 25 having a ring-like shape is disposed in the periphery of the effective range 24. In the first reflecting film 18, a first protective film 26 as a first electrically-conductive film is disposed on a surface facing to the second reflecting film 19, wherein the first protective film 26 covers the first reflecting film 18. The side surface of the first reflecting film 18 is exposed. Similarly, in the second reflecting film 19, a second protective film 27 as a second electrically-conductive film is disposed on a surface facing to the first reflecting film 18, wherein the second protective film 27 covers the second reflecting film 19. The side surface of the second reflecting film 19 is exposed.

The side surfaces of the first reflecting film 18 and the second reflecting film 19 are exposed. Therefore, when oxygen molecules or hydrogen molecules enter the first reflecting film 18 and the second reflecting film 19, the reflectance of the auxiliary range 25 is lowered. In the optical interference region 23, the effective range 24 is irradiated with the light. In the effective range 24, since the first reflecting film 18 and the second reflecting film 19 are not exposed, the reflectance is not lowered, and the quality can be maintained for a long period of time. The light having entered the effective range 24 of the optical interference region 23 is multiply reflected between the first reflecting film 18 and the second reflecting film 19. In the optical interference region 23, the light in phase is transmitted and proceeds in the proceeding direction of the incident light.

The first reflecting film 18 and the second reflecting film 19 are each formed of a metal film. As the material of the metal films, Ag (silver) alone and alloys consisting primarily of Ag (silver) are preferred for the material of the optical film. It should be noted that as the alloy including Ag as a principal constituent, there can be used, for example, a silver-samarium-copper alloy (AgSmCu), silver-carbon alloy (AgC), a silver-bismuth-neodymium alloy (AgBiNd), a silver-palladium-copper alloy (AgPdCu), a silver-gold alloy (AgAu), a silver-copper alloy (AgCu), and a silver-copper-gold alloy (AgCuAu). In particular, the silver-samarium-copper alloy (AgSmCu) and the silver-bismuth-neodymium alloy (AgBiNd) have heat resistance and sulfidation resistance, and are therefore high in long-term reliability of reflectance and are materials suitable for manufacturing the variable wavelength interference filter 5.

The first protective film 26 and the second protective film 27 can be made of any material having an electrical conductivity and a light transmissive property and hardly transmitting oxygen and water molecules, but are not particularly limited. As the material of the first protective film 26 and the second protective film 27, there can be used a film made of one or a plurality of substances selected from a group consisting of indium-based oxides, tin-based oxides, and zinc-based oxides, or a layered film composed of films including a substance selected from the group described above. Specifically, an indium-based oxide such as indium gallium oxide (InGaO), indium tin oxide (Sn doped indium oxide; ITO), or Ce doped indium oxide (ICO), a tin-based oxide such as tin oxide ($SnO_2$), and a zinc-based oxide such as Al doped zinc oxide (AZO), Ga doped zinc oxide (GZO), or zinc oxide (ZnO), and so on are used. Further, indium zinc oxide (IZO; registered trademark) composed of an indium-based oxide and a zinc-based oxide, and so on are also used. The films made of such materials are called a transparent electrically-conductive film, and have light permeability and a property of conducting electricity.

Further, these materials have an effect of blocking entrance of a gas causing oxidization, sulfurization, and so on, heat resistance, and light permeability, and can therefore function as the protective film for the first reflecting film 18 and the second reflecting film 19. Further, the materials described above have good adhesiveness with Ag and Ag alloys, and are reliable as an optical film. In particular, indium gallium oxide (InGaO) hardly reacts with silver, and therefore forms the protective film having a long-term reliability in the case of using Ag or an Ag alloy for the first reflecting film 18 and the second reflecting film 19. Further, indium gallium oxide (InGaO) has a high transmittance of roughly 80% or higher in the visible light region, and has an electrical conductivity of 0.001 Ω·cm or lower. In the present embodiment, for example, silver-samarium-copper alloy (AgSmCu) is used for the material of the first reflecting film 18 and the second reflecting film 19. Further, indium gallium oxide (InGaO) is used for the material of the first protective film 26 and the second protective film 27.

The first reflecting film 18 and the first protective film 26 are electrically connected to a first wiring line 28, and the first wiring line 28 is connected to a first terminal 29. The second reflecting film 19 and the second protective film 27 are electrically connected to a second wiring line 30. The second wiring line 30 is connected to a second terminal 32 via a resin bump 31. The first terminal 29 and the second terminal 32 are connected to the switch section 10d via a wiring line (not shown).

The variable wavelength interference filter 5 is provided with an actuator 33 used for adjusting a gap dimension of the gap 22. The actuator 33 is formed of a first electrode 34, a second electrode 35, and so on. The first electrode 34 is installed to the stationary substrate 15, and the second electrode 35 is installed to the movable substrate 16. The bottom of the recessed section 15b forms a first electrode installation surface 15d on which the first electrode 34 is installed. On the movable surface 16d, there are installed the second reflecting film 19 and the second electrode 35. The movable surface 16d is a flat surface, and the second reflecting surface 19 and the second electrode 35 are installed on the same plane. A third terminal 37 and a fourth terminal 43 are connected to the voltage control section 10b via a wiring line (not shown).

The first electrode 34 is connected to the voltage control section 10b via a first wiring line 36 and the third terminal 37. The second electrode 35 is connected to the voltage control section 10b via a second wiring line 41, the resin bump 42, and the fourth terminal 43. Thus, the gap control section 10 can apply the voltage between the first electrode 34 and the second electrode 35. When the voltage is applied between the first electrode 34 and the second electrode 35, an electrostatic force acts between the first electrode 34 and the second electrode 35. The gap control section 10 is capable of varying the gap 22 using the electrostatic force acting between the first electrode 34 and the second electrode 35.

The first protective film 26 is connected to the distance detection section 10c via the first reflecting film 18, the first wiring line 28, the first terminal 29, and the switch section 10d. The second protective film 27 is connected to the distance detection section 10c via the second reflecting film 19, the second wiring line 30, the resin bump 31, the second terminal 32, and the switch section 10d. The gap between the first protective film 26 and the second protective film 27 is defined as a protective film gap 44. The first protective film 26 and the second protective film 27 have a configuration of a capacitor having electrically-conductive films disposed so as to be opposed to each other. The distance detection section 10c detects the electric capacitance between the first protective film 26 and the second protective film 27. Further, the distance detection section 10c is provided with data of a relation table representing a relationship between the electric capacitance and the protective film gap 44 between the first protective film 26 and the second protective film 27. Further, the distance detection section 10c calculates the protective film gap 44 using the electric capacitance thus detected and the data of the relation table. The voltage control section 10b inputs the data of the protective film gap 44 from the distance detection section 10c, and then the gap control section 10 controls the electrostatic force acting between the first electrode 34 and the second electrode 35. Thus, the gap control section 10 can perform the control so that the gap 22 becomes the target gap.

It should be noted that in the explanation below, the plan view from the thickness direction of the stationary substrate 15 or the movable substrate 16, namely the plan view of the variable wavelength interference filter 5 viewed from the stacking direction of the stationary substrate 15 and the movable substrate 16, is referred to as a filter plan view. The center point of the first reflecting film 18 and the center point of the second reflecting film 19 coincide with each other in the filter plan view, and the center points of these reflecting films in the plan view are referred to as a filter center point 45.

Figure 3A:
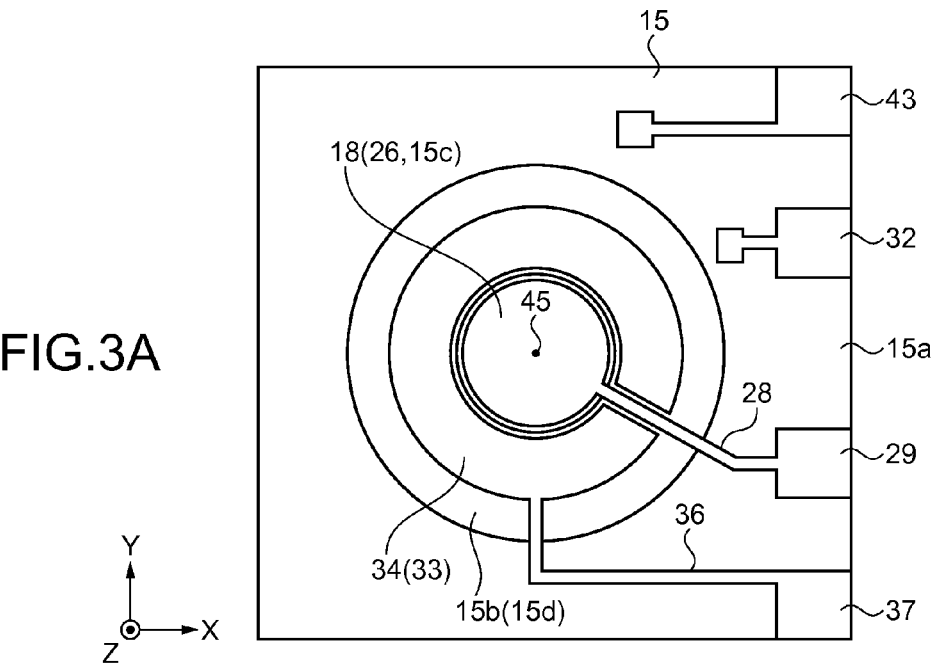
FIG. 3A is a schematic plan view showing a structure of a stationary substrate.

FIG. 3A is a schematic plan view showing a structure of the stationary substrate. The stationary substrate 15 is formed to have a thickness dimension larger than that of the movable substrate 16, and no deflection is caused in the stationary substrate 15 by the force due to the actuator 33 or an internal stress of film members (e.g., the first reflecting film 18) formed on the stationary substrate 15. The stationary substrate 15 is provided with the recessed section 15b formed using, for example, an etching process.

The recessed section 15b is formed to have a circular shape centered on the filter center point 45 in the filter plan view. The side surface of the recessed section 15b is set to the same place as the outer circumference of the connection section 16b in the filter plan view. The first electrode installation surface 15d is provided with the first electrode 34 constituting the actuator 33. The first electrode 34 can also be disposed directly on the first electrode installation surface 15d, or disposed on another thin film (layer) disposed on the first electrode installation surface 15d. Specifically, the first electrode 34 is formed to have a C-shaped arc-like shape cantered on the filter center point 45, and have a C-shape opening section disposed in a part on the X direction side and on the −Y direction side.

The mirror stage section 15c is provided with the first reflecting film 18 and the first protective film 26 disposed in an overlapping manner. The first reflecting film 18 can also be disposed directly on the mirror stage section 15c, or disposed on another thin film (layer) disposed on the mirror stage section 15c. The first wiring line 28 is connected to the C-shape opening section of the first electrode 34, and the first wiring line 28 is disposed so as to extend from the first reflecting film 18 to the first terminal 29 located on the outer peripheral edge of the stationary substrate 15. The first wiring line 28 and the first electrode 34 are arranged with a gap, and are therefore in an electrically isolated state. The material for forming the first electrode 34, the first wiring line 28, the first wiring line 36, the first terminal 29, the second terminal 32, the third terminal 37, and the fourth terminal 43 is only required to be a material having an electrical conductivity, but is not particularly limited. As the material of these electrodes, wiring lines, and terminals, there can be cited, for example, metal and indium tin oxide (ITO). Further, it is also possible for the first electrode 34, the first wiring line 28, and the first wiring line 36 to have an insulating film formed on the surface thereof. Further, the first terminal 29, the second terminal 32, the third terminal 37, and the fourth terminal 43 are connected to the gap control section 10 using, for example, an FPC or lead wires.

It is also possible to form an antireflection film on a plane of incidence of light (a surface on which the first reflecting film 18 is not disposed) of the stationary substrate 15 at a position opposed to the first reflecting film 18. The antireflection film can be formed by alternately stacking low refractive-index films and high refractive-index films. The antireflection film lowers the reflectance of the visible light on the stationary substrate 15 to increase the transmittance.

Figure 3B:
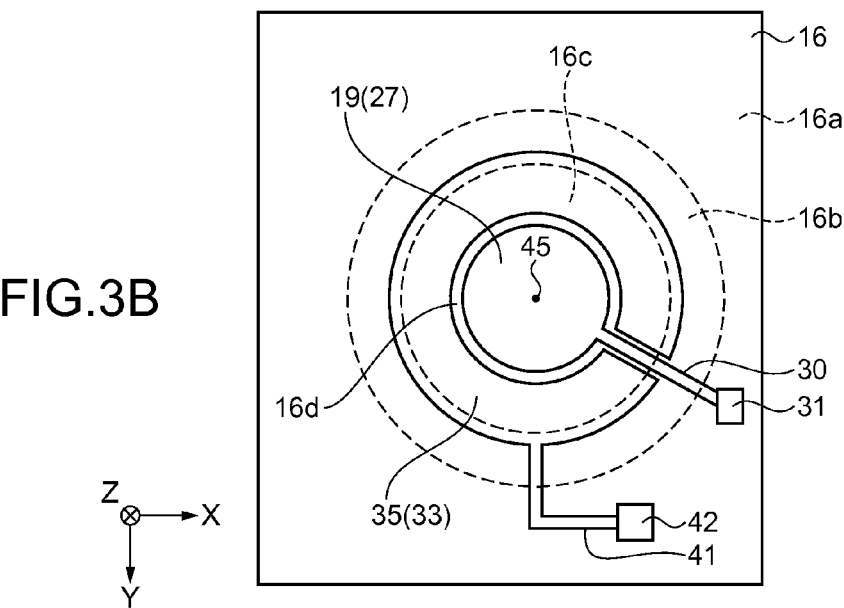
FIG. 3B is a schematic plan view showing a structure of a movable substrate.

FIG. 3B is a schematic plan view showing a structure of the movable substrate, and is a diagram of the movable substrate 16 viewed from the stationary substrate 15 side. As shown in FIG. 3B, the movable substrate 16 is provided with the movable section 16c having a circular shape centered on the filter center point 45, the connection section 16b coaxial with the movable section 16c and connected to the movable section 16c to hold the movable section 16c, and the second bonding section 16a disposed outside the connection section 16b in the filter plan view.

The movable section 16c is formed to have a thickness dimension larger than that of the connection section 16b, and is formed to have the same thickness dimension as that of the second bonding section 16a. The movable section 16c is provided with the second electrode 35 for constituting the actuator 33, and the second reflecting film 19. The second electrode 35 and the second reflecting film 19 can also be disposed directly on a movable surface 16d, or disposed on another thin film (layer) disposed on the movable surface 16d. It should be noted that an antireflection film can also be formed on a surface of the movable section 16c facing to an opposite side to the stationary substrate 15 similarly to the case of the stationary substrate 15.

The second electrode 35 is formed to have a C-shaped arc-like shape centered on the filter center point 45 so as to surround the second reflecting film 19. The second electrode 35 is provided with a C-shape opening section disposed in a part located on the X direction side and on the Y direction side of the movable substrate 16. The second wiring line 30 is connected to the C-shape opening section of the second electrode 35, and the second wiring line 30 is disposed so as to extend from the second reflecting film 19 and the second protective film 27 to the resin bump 31 located on the outer peripheral edge of the movable substrate 16. The second wiring line 30 and the second electrode 35 are arranged with a gap, and are therefore in an electrically isolated state. The resin bump 31 is arranged so as to partially overlap the second terminal 32 when the first bonding section 15a and the second bonding section 16a are aligned with each other.

The second electrode 35 is provided with the second wiring line 41 disposed on the Y direction side of the movable substrate 16. The second wiring line 41 is extracted from the second electrode 35 to the resin bump 42. The resin bump 42 is arranged so as to partially overlap the fourth terminal 43 when the first bonding section 15a and the second bonding section 16a are aligned with each other. The material for forming the second wiring line 30, the second electrode 35 and the second wiring line 41 is only required to have an electrical conductivity, but is not particularly limited. As the material for forming the second electrode 35, the second wiring line 41, and fourth terminal 43, and the third terminal 37, there can be cited, for example, metal and ITO. Further, it is also possible for the second electrode 35 and the second wiring line 41 to have an insulating film formed on the surface thereof.

The connection section 16b is a diaphragm surrounding the periphery of the movable section 16c, and is formed to have a thickness dimension smaller than that of the movable section 16c. Such a connection section 16b is arranged to be easier to be deflected than the movable section 16c. It is arranged that it is possible to displace the movable section 16c with respect to the stationary substrate 15 due to the electrostatic force acting between the first electrode 34 and the second electrode 35. On this occasion, since the movable section 16c is larger in thickness dimension than the connection section 16b, the rigidity of the movable section 16c is made higher than that of the connection section 16b. Therefore, also in the case in which the movable section 16c is displaced with respect to the stationary substrate 15, the shape variation of the movable section 16c can be suppressed. It should be noted that the shape of the connection section 16b is not limited to the diaphragm shape, but it is also possible to adopt a configuration of, for example, providing beam-like holding sections arranged at regular angular intervals centered on the filter center point 45 of the movable section 16c.

Figure 4:
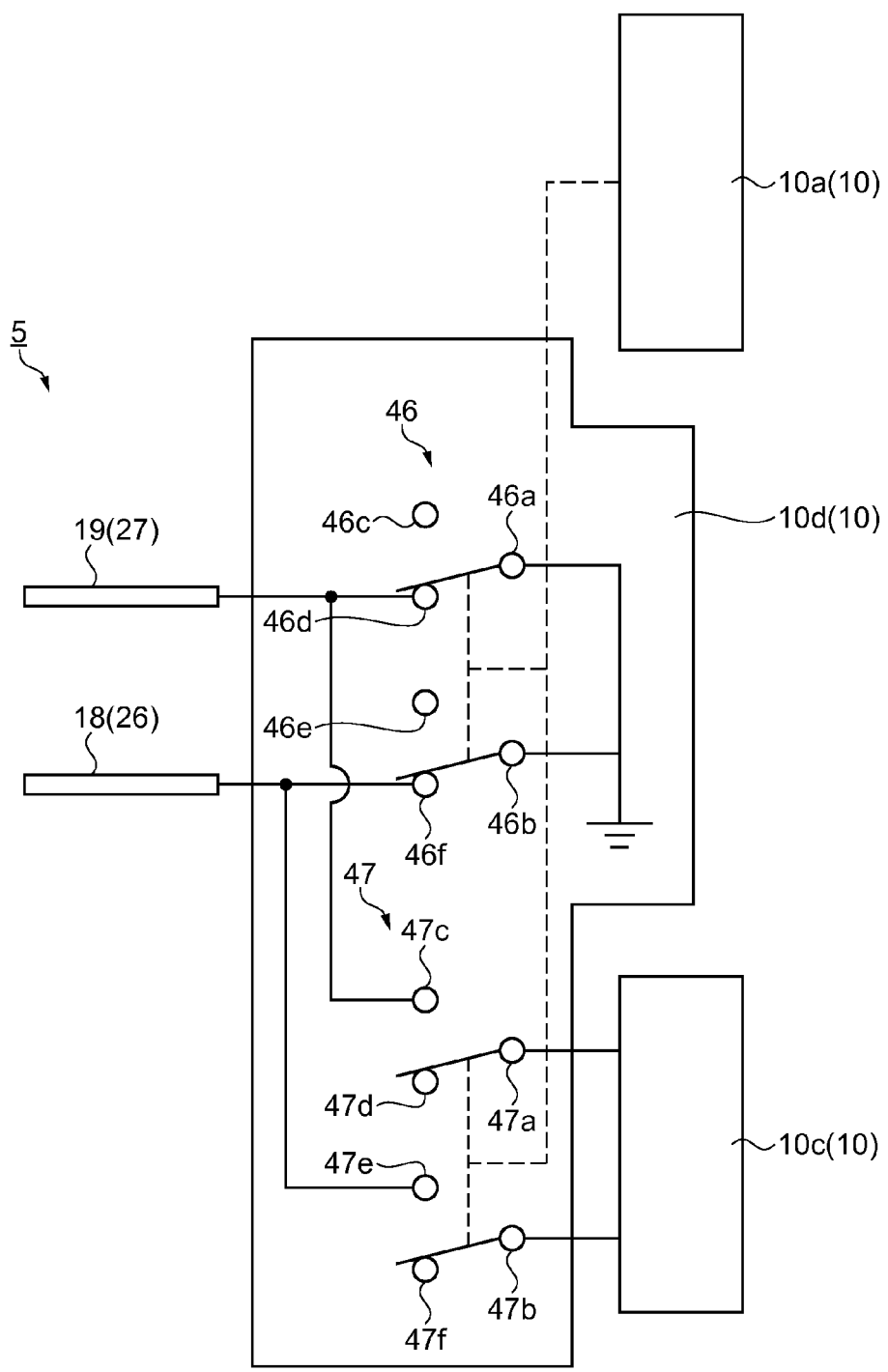
FIG. 4 is a circuit diagram for explaining a structure of a switch section.

FIG. 4 is a circuit diagram for explaining a structure of the switch section. As shown in FIG. 4, in the switch section 10d, there are installed two switches, namely a first switch 46 and a second switch 47. Each of the switches has a configuration of a double-circuit two-contact switch. The first switch 46 is provided with a first movable segment 46a, a second movable segment 46b, a first contact 46c, a second contact 46d, a third contact 46e, and a fourth contact 46f.

The first movable segment 46a and the second movable segment 46b are both grounded. The first contact 46c is an isolated contact, and not connected. The second contact 46d is connected to the second reflecting film 19 and the second protective film 27. The first movable segment 46a is electrically connected to either one of the first contact 46c and the second contact 46d. Similarly, the third contact 46e is an isolated contact, and not connected. The fourth contact 46f is connected to the first reflecting film 18 and the first protective film 26. The second movable segment 46b is electrically connected to either one of the third contact 46e and the fourth contact 46f.

The first movable segment 46a and the second movable segment 46b are controlled by the overall control section 10a in tandem with each other. When the overall control section 10a makes the first movable segment 46a be electrically connected to the first contact 46c and makes the second movable segment 46b be electrically connected to the third contact 46e, the first switch 46 becomes in a state of being separated from the first protective film 26 and the second protective film 27. In contrast, when the overall control section 10a makes the first movable segment 46a be electrically connected to the second contact 46d and makes the second movable segment 46b be electrically connected to the fourth contact 46f, the first switch 46 becomes in a state of grounding the first protective film 26 and the second protective film 27. Therefore, the overall control section 10a can control whether or not the first protective film 26 and the second protective film 27 are grounded.

The second switch 47 is provided with a first movable segment 47a, a second movable segment 47b, a first contact 47c, a second contact 47d, a third contact 47e, and a fourth contact 47f. The first movable segment 47a and the second movable segment 47b are connected to the distance detection section 10c. The first contact 47c is connected to the second reflecting film 19 and the second protective film 27. The second contact 47d is an isolated contact, and not connected. The first movable segment 47a is electrically connected to either one of the first contact 47c and the second contact 47d. Similarly, the third contact 47e is connected to the first reflecting film 18 and the first protective film 26. The fourth contact 47f is an isolated contact, and not connected. The second movable segment 47b is electrically connected to either one of the third contact 47e and the fourth contact 47f.

The first movable segment 47a and the second movable segment 47b are controlled by the overall control section 10a in tandem with each other. When the overall control section 10a makes the first movable segment 47a be electrically connected to the first contact 47c and makes the second movable segment 47b be electrically connected to the third contact 47e, the second switch 47 becomes in a state of connecting the first protective film 26 and the second protective film 27 to the distance detection section 10c. In contrast, when the overall control section 10a makes the first movable segment 47a be electrically connected to the second contact 47d and makes the second movable segment 47b be electrically connected to the fourth contact 47f, the second switch 47 becomes in a state of being separated from the first protective film 26 and the second protective film 27. Therefore, the overall control section 10a can control whether or not the first protective film 26 and the second protective film 27 are made to be electrically connected to the distance detection section 10c.

When the gap control section 10 measures the protective film gap 44, firstly, the overall control section 10a switches the first switch 46 and the second switch 47. In the first switch 46, the overall control section 10a makes the first movable segment 46a have contact with the first contact 46c. Further, the overall control section 10a makes the second movable segment 46b have contact with the third contact 46e. Further, in the second switch 47, the overall control section 10a makes the first movable segment 47a have contact with the first contact 47c. Further, the overall control section 10a makes the second movable segment 47b have contact with the third contact 47e. Thus, the first protective film 26 and the second protective film 27 are connected to the distance detection section 10c. Then, the distance detection section 10c measures the protective film gap 44.

In the case in which the gap control section 10 does not measure the protective film gap 44, the overall control section 10a makes the first movable segment 46a have contact with the second contact 46d in the first switch 46. Further, the overall control section 10a makes the second movable segment 46b have contact with the fourth contact 46f. In the second switch 47, the overall control section 10a makes the first movable segment 47a have contact with the second contact 47d. Further, the overall control section 10a makes the second movable segment 47b have contact with the fourth contact 47f. Thus, the first protective film 26 and the second protective film 27 are each grounded.

The molecules such as the water molecules and the oxygen molecules migrate and collide with each other between the first protective film 26 and the second protective film 27. On this occasion, static electricity occurs in each of the molecules in some cases. Further, when the molecules with the static electricity have contact with the first protective film 26 and the second protective film 27, the first protective film 26 and the second protective film 27 are charged. When a voltage difference occurs between the first protective film and the second protective film 27 due to the static electricity, the electrostatic force occurs between the first protective film 26 and the second protective film 27. Thus, the protective film gap 44 varies, and therefore the gap 22 varies. Due to the variation in the gap 22, the wavelength of the light to be transmitted through the variable wavelength interference filter 5 varies. Therefore, the overall control section 10a grounds the first protective film 26 and the second protective film 27 at predetermined time intervals. Thus, since the static electricity of the first protective film 26 and the second protective film 27 is removed, the gap 22 can be controlled with good accuracy.

It should be noted that as the first switch 46 and the second switch 47, it is also possible to use switching elements each formed of a semiconductor such as a transistor, or electromagnetic switches can also be adopted. In the case in which the current is small, the switching element formed of a semiconductor is preferably used since the switching element formed of a semiconductor is easy to manufacture and has durability. In the present embodiment, for example, the switching elements each formed of a semiconductor are used for the first switch 46 and the second switch 47.

Figure 5A:
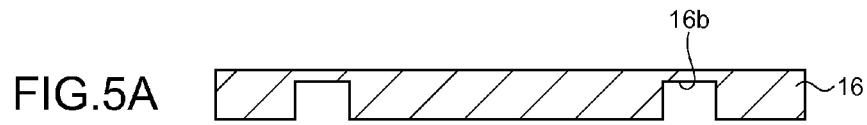
FIGS. 5A through 5H are schematic diagrams for explaining a method of manufacturing the variable wavelength interference filter.
Figure 5B:
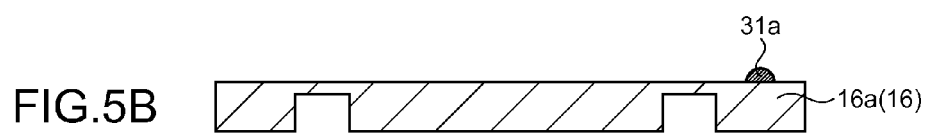

Next, a method of manufacturing the variable wavelength interference filter 5 will be explained. FIGS. 5A through 5H and 6A through 6F are schematic diagrams for explaining the method of manufacturing the variable wavelength interference filter. Firstly, as shown in FIG. 5A, the movable substrate 16 provided with the connection section 16*b* is prepared. The connection section 16*b* can be formed by performing patterning using a known lithography method, and then performing etching. Subsequently, as shown in FIG. 5B, a resin section 31*a* of the resin bump 31 is formed in the second bonding section 16*a* of the movable substrate 16. A resin pattern is formed using a method such as screen printing, offset printing, or inkjet printing, and is then dried to be solidified.

Figure 5C:
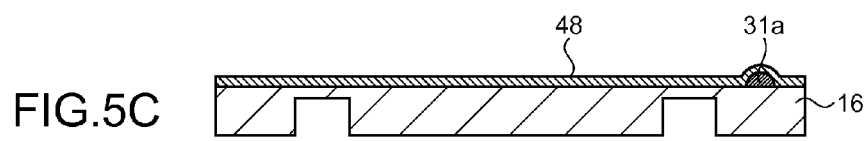
Figure 5D:
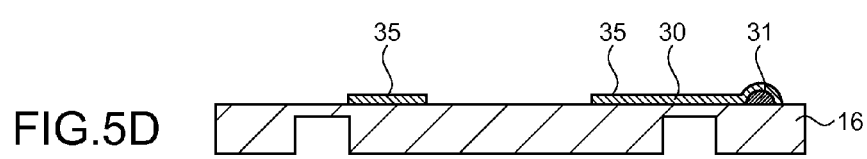

Subsequently, as shown in FIG. 5C, a conductor solid film 48 made of the material of the second wiring line 30 and the second electrode 35 is formed. A deposition method such as a vapor deposition method or a sputtering method can be used for forming the conductor solid film 48. Then, as shown in FIG. 5D, the second wiring line 30 and the second electrode 35, and the resin bump 31 are formed by patterning the conductor solid film 48. The second wiring line 30, the second electrode 35, and the resin bump 31 can be formed by patterning a mask using a known lithography method, and then etching the conductor solid film 48. It should be noted that the second wiring line 41 and the resin bump 42 are also formed concurrently in the process of forming the second electrode 35 and the resin bump 31.

Figure 5E:
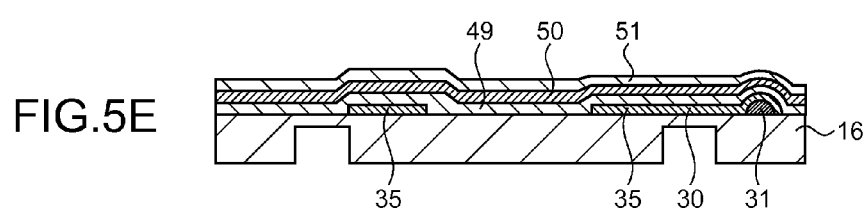

Subsequently, as shown in FIG. 5E, a second reflecting solid film 49 made of the material of the second reflecting film 19 is formed so as to overlap the second wiring line 30 and the second electrode 35 on the movable substrate 16. Subsequently, the second protective solid film 50 as an electrically-conductive film made of the material of the second protective film 27 is formed so as to overlap the second reflecting solid film 49. Further, a resist film 51 made of photosensitive resin or the like is formed so as to overlap the second protective solid film 50. A deposition method such as a vapor deposition method or a sputtering method can be used for forming the second reflecting solid film 49 and the second protective solid film 50. For the resist film 51, a known deposition method such as a spin coat method can be used.

Figure 5F:
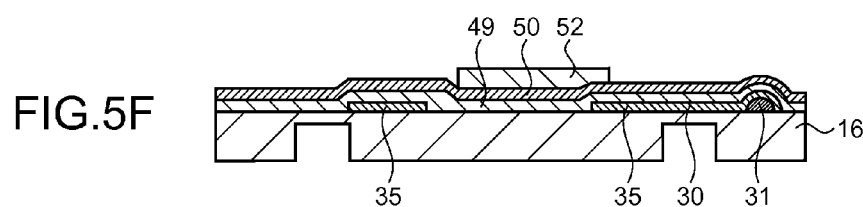
Figure 5G:
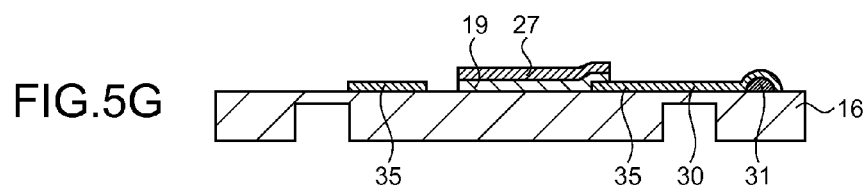

Subsequently, as shown in FIG. 5F, a mask 52 is formed by patterning the resist film 51. The mask 52 is formed by exposing and then etching the resist film 51. Subsequently, as shown in FIG. 5G, the second reflecting film 19 and the second protective film 27 are formed. The shapes of the second reflecting film 19 and the second protective film 27 are the same as the shape of the mask 52, and the second reflecting film 19 and the second protective film 27 are formed using the same mask 52. Therefore, compared to the case of using a mask for the second reflecting film 19 and a mask for the second protective film 27, the second reflecting film 19 and the second protective film 27 can be formed with high productivity.

Figure 5H:
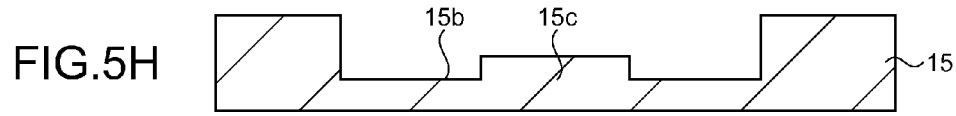
Figure 6A:
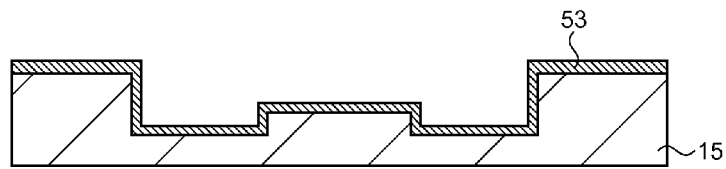
FIGS. 6A through 6F are schematic diagrams for explaining a method of manufacturing the variable wavelength interference filter.
Figure 6B:
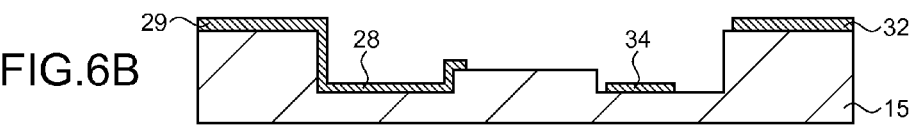

Then, as shown in FIG. 5H, a stationary substrate 15 provided with the recessed section 15*b* and the mirror stage section 15*c* is prepared. The recessed section 15*b* can be formed by performing patterning using a known lithography method, and then performing etching. Subsequently, as shown in FIG. 6A, a conductor solid film 53 made of the material of the first wiring line 28, the first terminal 29, the second terminal 32, and the first electrode 34 is formed. A deposition method such as a vapor deposition method or a sputtering method can be used for forming the conductor solid film 53. Subsequently, as shown in FIG. 6B, the first wiring line 28, the first terminal 29, the second terminal 32, and the first electrode 34 are formed by patterning the conductor solid film 53. The first wiring line 28, the first terminal 29, the second terminal 32, and the first electrode 34 can be formed by patterning a mask using a known lithography method, and then etching the conductor solid film 53. It should be noted that the first wiring line 36, the third terminal 37, and the fourth terminal 43 are also formed concurrently in the process of forming the first wiring line 28, the first terminal 29, the second terminal 32, and the first electrode 34.

Figure 6C:
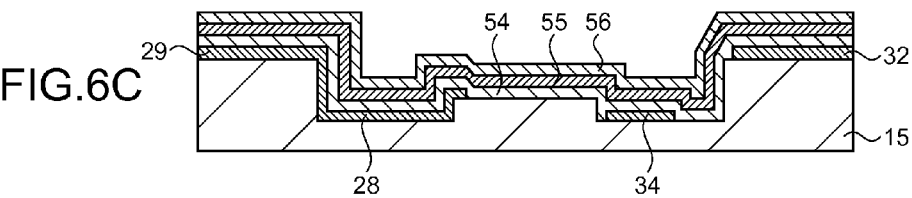

Subsequently, as shown in FIG. 6C, a first reflecting solid film 54 made of the material of the first reflecting film 18 is formed so as to overlap the first wiring line 28, the first terminal 29, the second terminal 32, and the first electrode 34 on the stationary substrate 15. Subsequently, the first protective solid film 55 as an electrically-conductive film made of the material of the first protective film 26 is formed so as to overlap the first reflecting solid film 54. Further, a resist film 56 made of photosensitive resin or the like is formed so as to overlap the first protective solid film 55. A deposition method such as a vapor deposition method or a sputtering method can be used for forming the first reflecting solid film 54 and the first protective solid film 55. For the resist film 56, a known deposition method such as a spin coat method can be used.

Figure 6D:
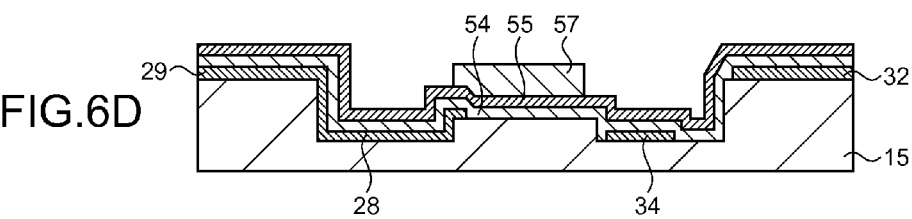
Figure 6E:
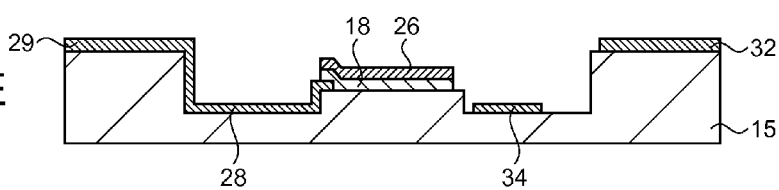

Subsequently, as shown in FIG. 6D, a mask 57 is formed by patterning the resist film 56. The mask 57 is formed by exposing and then etching the resist film 56. Subsequently, as shown in FIG. 6E, the first reflecting film 18 and the first protective film 26 are formed. The shapes of the first reflecting film 18 and the first protective film 26 are the same as the shape of the mask 57, and the first reflecting film 18 and the first protective film 26 are formed using the same mask 57. Therefore, compared to the case of using a mask for the first reflecting film 18 and a mask for the first protective film 26, the first reflecting film 18 and the first protective film 26 can be formed with high productivity.

Indium gallium oxide (InGaO) is used for the material of the first protective film 26 and the second protective film 27. When using ITO for the material of the first protective film 26 and the second protective film 27, ITO is a crystalline film, and nitrohydrochloric acid needs to be used to pattern the ITO. Nitrohydrochloric acid has a possibility to cause damage to the wiring lines, the elements, and so on. As the etching solution used to pattern indium gallium oxide (InGaO), oxalic acid, for example, can be used. The etching solution for indium gallium oxide (InGaO) is a solution that does not typically cause damage to the wiring lines, the elements, and so on compared to nitrohydrochloric acid. Therefore, the variable wavelength interference filter 5 can be manufactured with high quality.

Figure 6F:
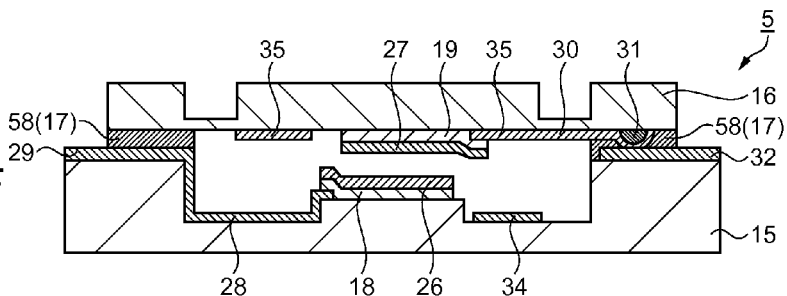

Subsequently, as shown in FIG. 6F, the stationary substrate 15 and the movable substrate 16 are bonded to each other. Plasma polymerized films 58 are deposited respectively on the stationary substrate 15 and the movable substrate 16. Subsequently, the plasma polymerized films 58 are bonded to each other to thereby bond the stationary substrate 15 and the movable substrate 16 to each other. The plasma polymerized films 58 thus bonded to each other form the bonding film 17. The variable wavelength interference filter 5 is completed through the processes described above.

As described above, according to the present embodiment, there are obtained the following advantages.

(1) According to the present embodiment, the first protective film 26 is disposed so as to overlap the first reflecting film 18, and the second protective film 27 is disposed so as to overlap the second reflecting film 19. It is possible to suppress temporal changes in the first reflecting film 18 and the second reflecting film 19 using the first protective film 26 and the second protective film 27.

(2) According to the present embodiment, the first protective film 26 and the second protective film 27 each have an electrical conductivity. Further, the first protective film 26 and the second protective film 27 are electrically grounded by the first switch 46. In some cases, moisture adheres to the first protective film 26 and the second protective film 27 to thereby charge the first protective film 26 and the second protective film 27. On this occasion, when a potential difference occurs between the first protective film 26 and the second protective film 27, the electrostatic force acts between the first protective film 26 and the second protective film 27. The distance between the first reflecting film 18 and the second reflecting film 19 varies due to the electrostatic force. On this occasion, by electrically shorting the first protective film 26 and the second protective film 27, the potential difference between the first protective film 26 and the second protective film 27 vanishes. Therefore, since the electrostatic force no longer acts between the first protective film 26 and the second protective film 27, the distance between the first reflecting film 18 and the second reflecting film 19 can be maintained with high accuracy. As a result, it is possible to prevent the wavelength of the light to be transmitted through the variable wavelength interference filter 5 from varying.

(3) According to the present embodiment, the first reflecting film 18 and the second reflecting film 19 are each a film including silver, and are each a film high in reflectance. Further, the first protective film 26 and the second protective film 27 are each a film consisting primarily of InGaO. Since InGaO resists reacting with silver, the deterioration of the reflectance of the first reflecting film 18 and the second reflecting film 19 can be suppressed.

(4) According to the present embodiment, the side surfaces of the first reflecting film 18 and the second reflecting film 19 are exposed. In other words, the side surface of the first reflecting film 18 is not covered with the first protective film 26, and the side surface of the second reflecting film 19 is not covered with the second protective film 27. The shapes of the first reflecting film 18 and the first protective film 26 are formed by stacking the first reflecting solid film 54 and the first protective solid film 55 on each other, and then patterning the result. Therefore, the number of processes can be decreased compared to the case of patterning the first reflecting film 18 and then patterning the first protective film 26. The configurations of the second reflecting film 19 and the second protective film 27 are substantially the same as the configurations of the first reflecting film 18 and the first protective film 26. Therefore, the number of processes can be decreased compared to the case of patterning the second reflecting film 19 and then patterning the second protective film 27. As a result, the variable wavelength interference filter 5 can be manufactured with high productivity.

(5) According to the present embodiment, the distance detection section 10c detects the capacitance between the first protective film 26 and the second protective film 27. The capacitance and the protective film gap 44 are negatively correlated with each other. Therefore, the protective film gap 44 can be detected by detecting the capacitance. By adding the film thicknesses of the first protective film 26 and the second protective film 27 to the protective film gap 44, the gap 22 is calculated. As a result, the gap 22 can be detected.

(6) According to the present embodiment, the first reflecting film 18 and the second reflecting film 19 each have the effective range 24 and the auxiliary range 25. The effective range 24 is a range irradiated with the light, and the auxiliary range 25 is a range not irradiated with the light. The auxiliary range 25 is disposed so as to surround the effective range 24. The side surfaces of the first reflecting film 18 and the second reflecting film 19 are exposed, and there is a possibility that the reflectance is deteriorated. On this occasion, the deterioration of the reflectance occurs in the auxiliary range 25, and the effective range 24 is distant from the side surface, and therefore resists being deteriorated in reflectance. Therefore, the long-term reliability of the variable wavelength interference filter 5 can be raised.

(7) According to the present embodiment, the patterning is performed in the state in which the first reflecting solid film 54 is covered with the first protective solid film 55. Therefore, since the first reflecting film 18 is protected by the first protective film 26 during and after the manufacturing process, the first reflecting film 18 can be manufactured with high quality. Similarly, since the second reflecting film 19 is protected by the second protective film 27 during and after the manufacturing process, the second reflecting film 19 can be manufactured with high quality.

Second Embodiment

Optical Filter Device

Figure 7:
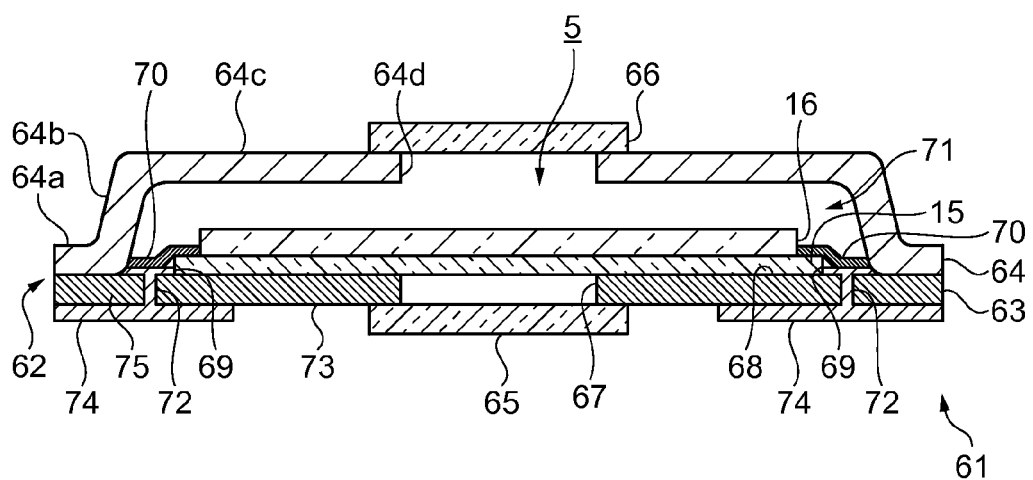
FIG. 7 is a cross-sectional view showing a schematic configuration of an optical filter device according to a second embodiment.

Next, an optical filter device as an embodiment of the invention will be explained. The optical filter device according to the present embodiment is equipped with the variable wavelength interference filter 5 described as the first embodiment. It should be noted that the explanation of the point the same as in the first embodiment will be omitted. FIG. 7 is a cross-sectional view showing the schematic configuration of the optical filter device.

As shown in FIG. 7, the optical filter device 61 as an electronic apparatus is provided with the variable wavelength interference filter 5, and a housing 62 for housing the variable wavelength interference filter 5. The housing 62 is provided with a base substrate 63, a lid 64, a base-side glass substrate 65, and a lid-side glass substrate 66.

The base substrate 63 is formed of, for example, a single layer ceramic substrate. The stationary substrate 15 of the variable wavelength interference filter 5 is installed in the base substrate 63. As a method of installing the stationary substrate 15 in the base substrate 63, it is possible to adopt a method of disposing the stationary substrate 15 via, for example, an adhesive, or a method of disposing the stationary substrate 15 by, for example, being fitted to another fixation member or the like. Further, the base substrate 63 is provided with a light passage hole 67 opening in an area opposed to the optical interference region (the region where the first reflecting film 18 and the second reflecting film 19 are opposed to each other). Further, the base-side glass substrate 65 is bonded so as to cover the light passage hole 67. As the bonding method of the base-side glass substrate 65, for example, glass frit bonding using a glass frit, which is a scrap of glass obtained by melting a glass material at high temperature and then rapidly cooling it, and bonding with epoxy resin or the like can be used.

A base inner surface 68 of the base substrate 63, which is located on the lid 64 side, is provided with inner terminal sections 69 corresponding respectively to the first terminal 29, the second terminal 32, the third terminal 37, and the fourth terminal 43 of the variable wavelength interference filter 5. It should be noted that the connection between the first terminal 29, the second terminal 32, the third terminal 37, and the fourth terminal 43, and the respective inner terminal sections 69 can be achieved using, for example, a flexible printed circuit (FPC) 70, and bonding therebetween is achieved using, for example, Ag paste, an anisotropic conductive film (ACF), or anisotropic conductive paste (ACP). It should be noted that the Ag paste emitting little outgas is preferably used in the case of keeping the internal space 71 in the vacuum state. Further, wiring connection with, for example, wire bonding can also be performed besides the connection using the FPC 70. Further, the base substrate 63 is provided with through holes 72 formed so as to correspond to the positions where the respective inner terminal sections 69 are disposed, and the inner terminal sections 69 are connected to outer terminal sections 74 disposed on a base outer surface 73 of the base substrate 63 on the opposite side to the base inner surface 68 via electrically conductive members with which the through holes 72 are filled, respectively. Further, the outer peripheral portion of the base substrate 63 is provided with a base bonding section 75 to be bonded to the lid 64.

The lid 64 is provided with a lid bonding section 64a to be bonded to the base bonding section 75 of the base substrate 63, and a side wall section 64b continuing from the lid bonding section 64a and then rising in a direction getting away from the base substrate 63. Further, the lid 64 is provided with a top surface section 64c continuing from the side wall section 64b and covering the movable substrate 16 side of the variable wavelength interference filter 5. The lid 64 can be formed of an alloy such as kovar, or metal. The lid 64 is adhesively bonded to the base substrate 63 by the lid bonding section 64a and the base bonding section 75 of the base substrate 63 bonded to each other. As the bonding method, there can be cited, for example, soldering with brazing silver or the like, sealing with a eutectic alloy layer, welding with low-melting-point glass, glass adhesion, glass frit bonding, and adhesion with epoxy resin, besides laser welding. These bonding methods can arbitrarily be selected in accordance with the materials of the base substrate 63 and the lid 64, the bonding environment, and so on.

The top surface section 64c of the lid 64 is set to be parallel to the base substrate 63. The top surface section 64c is provided with a light passage hole 64d opening formed in an area opposed to the optical interference region of the variable wavelength interference filter 5. Further, the lid-side glass substrate 66 is bonded so as to cover the light passage hole 64d. As the bonding method of the lid-side glass substrate 66, the glass frit bonding, adhesion with epoxy resin, and so on can be used similarly to the bonding of the base-side glass substrate 65.

In such an optical filter device 61, since the variable wavelength interference filter 5 is protected by the housing 62, the characteristic change of the variable wavelength interference filter 5 due to foreign matters, gases and so on included in the atmosphere can be prevented, and further, breakage of the variable wavelength interference filter 5 due to external factors can be prevented. Further, since invasion of charged particles can be prevented, charging of the first terminal 29 and the second terminal 32 can be prevented. Therefore, generation of a coulomb force due to charging can be suppressed, and thus, parallelism between the first reflecting film 18 and the second reflecting film 19 can more surely be maintained.

Further, in the case of transporting the variable wavelength interference filter 5 to an assemble line for performing the operation of incorporating the variable wavelength interference filter 5 into the optical module 3 or the electronic apparatus, or the like, the variable wavelength interference filter 5 protected by the optical filter device 61 can safely be transported. Further, since the optical filter device 61 is provided with outer terminal sections 74 exposed on the outer peripheral surface of the housing 62, it becomes possible to easily provide wiring when being incorporated into the optical module 3 or the electronic apparatus.

The variable wavelength interference filter 5 is capable of switching the electrical connection of the first reflecting film 18 and the second reflecting film 19. Therefore, since the electrostatic force acting between the first protective film 26 and the second protective film 27 can be removed, the distance between the first reflecting film 18 and the second reflecting film 19 can be maintained with high accuracy. As a result, it is possible for the optical filter device 61 to prevent the wavelength of the light to be transmitted from varying. Next, an example of applying the variable wavelength interference filter 5 to a colorimetric device for measuring a color will be described.

Colorimetric Device

Figure 8:
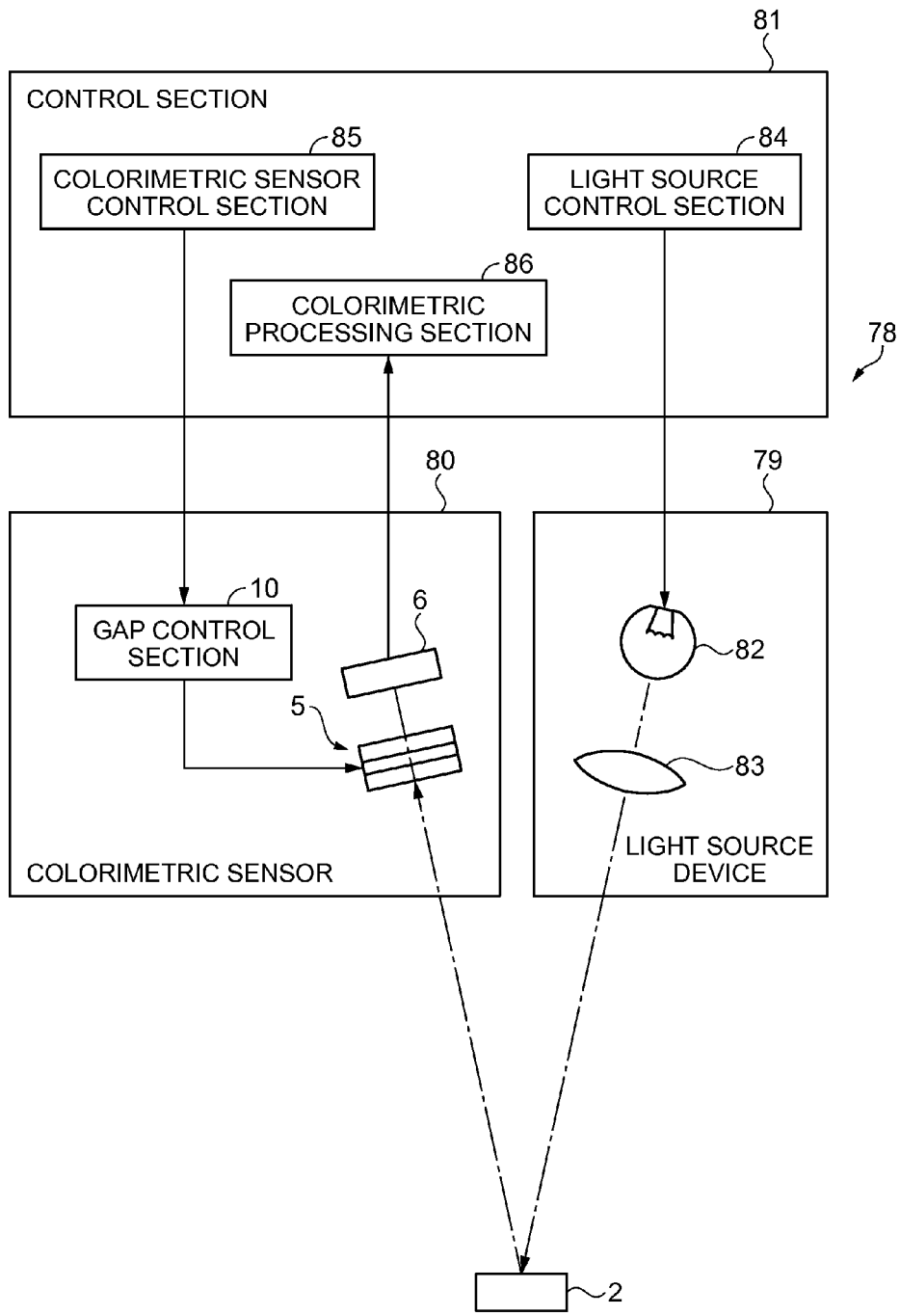
FIG. 8 is a block diagram showing a configuration of a colorimetric device.

FIG. 8 is a block diagram showing a configuration of the colorimetric device. As shown in FIG. 8, the colorimetric device 78 as the electronic apparatus is provided with a light source device 79 for emitting light to the measurement object 2, a colorimetric sensor 80 (an optical module), and a control device 81 for controlling an overall operation of the colorimetric device 78. Further, the colorimetric device 78 makes the light emitted from the light source device 79 be reflected by the measurement object 2. The test target light thus reflected is received by the colorimetric sensor 80, the colorimetric device 78 analyzes and then measures the chromaticity of the test target light, namely the color of the measurement object 2 based on the detection signal output from the colorimetric sensor 80.

The light source device 79 is provided with a light source 82 and a plurality of lenses 83 (one of the lenses is shown alone in the drawing), and emits, for example, reference light (e.g., white light) to the measurement object 2. Further, a collimator lens can be included in the plurality of lenses 83. In this case, the collimator lens converts the reference light emitted from the light source 82 into parallel light, and the light source device 79 emits the light from a projection lens (not shown) toward the measurement object 2. It should be noted that although in the present embodiment the colorimetric device 78 provided with the light source device 79 is described as an example, in the case in which, for example, the measurement object 2 is a light emitting member such as a liquid crystal panel, it is also possible to adopt a configuration not provided with the light source device 79.

The colorimetric sensor 80 is provided with the variable wavelength interference filter 5, the detector 6 for receiving the light transmitted through the variable wavelength interference filter 5, and the gap control section 10 for controlling the wavelength of the light to be transmitted through the variable wavelength interference filter 5. Further, the colorimetric sensor 80 is provided with an incident optical lens (not shown) disposed at a place opposed to the variable wavelength interference filter 5. The incident optical lens guides the reflected light (the test target light) reflected by the measurement object 2 to the inside of the colorimetric sensor 80. Further, in the colorimetric sensor 80, the variable wavelength interference filter 5 disperses the light with a predetermined wavelength out of the test target light input from the incident optical lens, and then the detector 6 receives the light thus dispersed.

The control device 81 controls an overall operation of the colorimetric device 78. As the control device 81, a colorimetry-dedicated computer, and so on can be used besides, for example, a general-purpose personal computer and a hand-held terminal. Further, the control device 81 is configured including a light source control section 84, a colorimetric sensor control section 85, a colorimetric processing section 86, and so on. The light source control section 84 is connected to the light source device 79, and outputs a predetermined control signal to the light source device 79 based on, for example, a setting input by the user to thereby make the light source device 79 emit white light with a predetermined brightness. The colorimetric sensor control section 85 is connected to the colorimetric sensor 80. Further, the colorimetric sensor control section 85 sets the wavelength of the light to be received by the colorimetric sensor 80 based on, for example, the setting input by the user, and then outputs the control signal, which instructs the detection of the intensity of the received light having the wavelength thus set, to the colorimetric sensor 80. Thus, the gap control section 10 applies the voltage to the actuator 33 based on the control signal to thereby drive the variable wavelength interference filter 5. The colorimetric processing section 86 analyzes the chromaticity of the measurement object 2 based on the received light intensity detected by the detector 6.

The variable wavelength interference filter 5 is capable of switching the electrical connection of the first reflecting film 18 and the second reflecting film 19. Therefore, since the electrostatic force acting between the first protective film 26 and the second protective film 27 can be removed, the distance between the first reflecting film 18 and the second reflecting film 19 can be maintained with high accuracy. As a result, since it is possible for the variable wavelength interference filter 5 to prevent the wavelength of the light to be transmitted from varying, it is possible for the colorimetric device 78 to measure the color tone with high quality.

Gas Detection Device

Next, as an example of the electronic apparatus, an optical base system for detecting presence of a specific material will be introduced. As an example of such a system, there can be cited, for example, an in-car gas leak detector adopting a spectroscopic measurement method using the optical module and detecting a specific gas with high sensitivity, and a gas detection device such as an optoacoustic noble-gas detector for a breath test. An example of such a gas detection device will hereinafter be explained with reference to the accompanying drawings.

Figure 9:
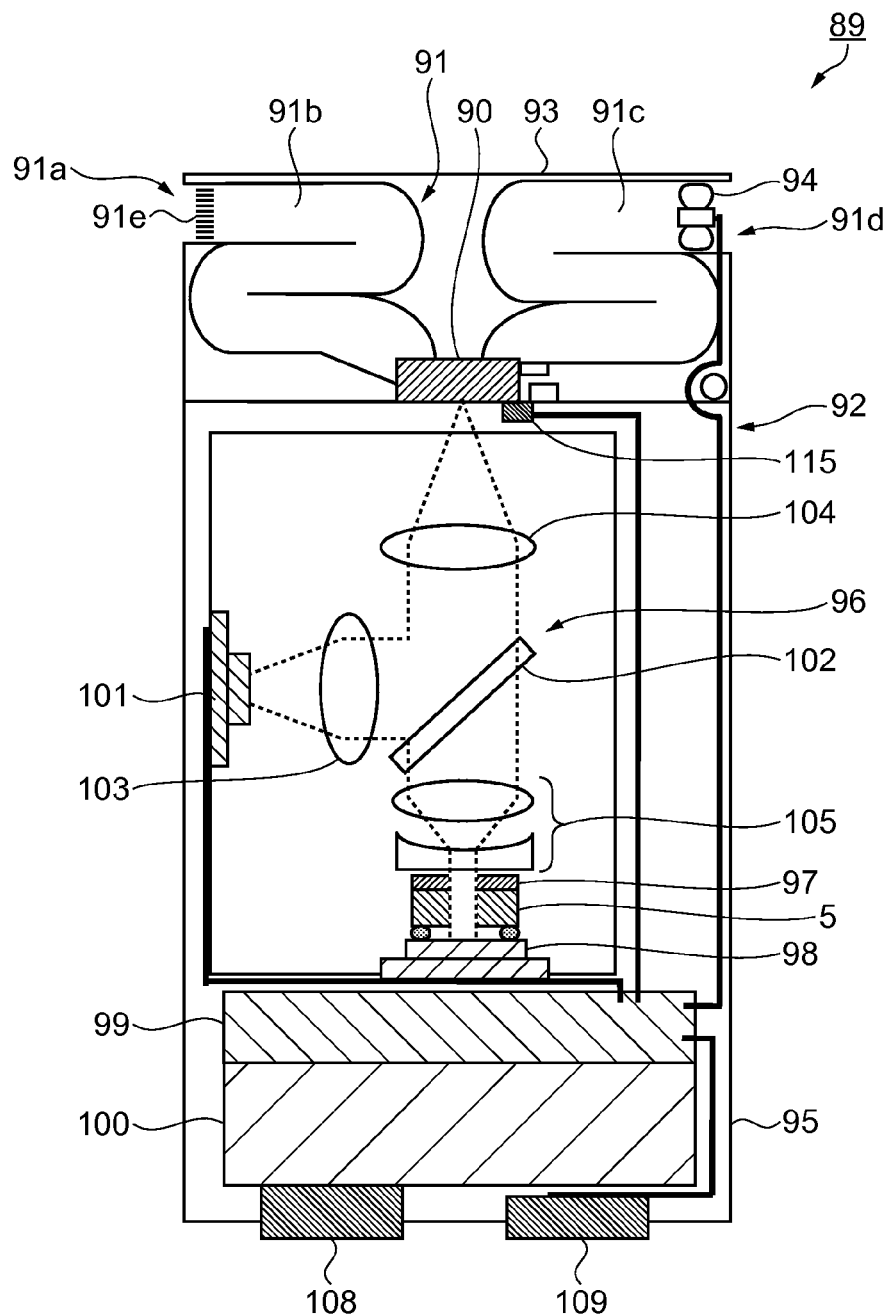
FIG. 9 is a schematic front view showing a configuration of a gas detection device.
Figure 10:
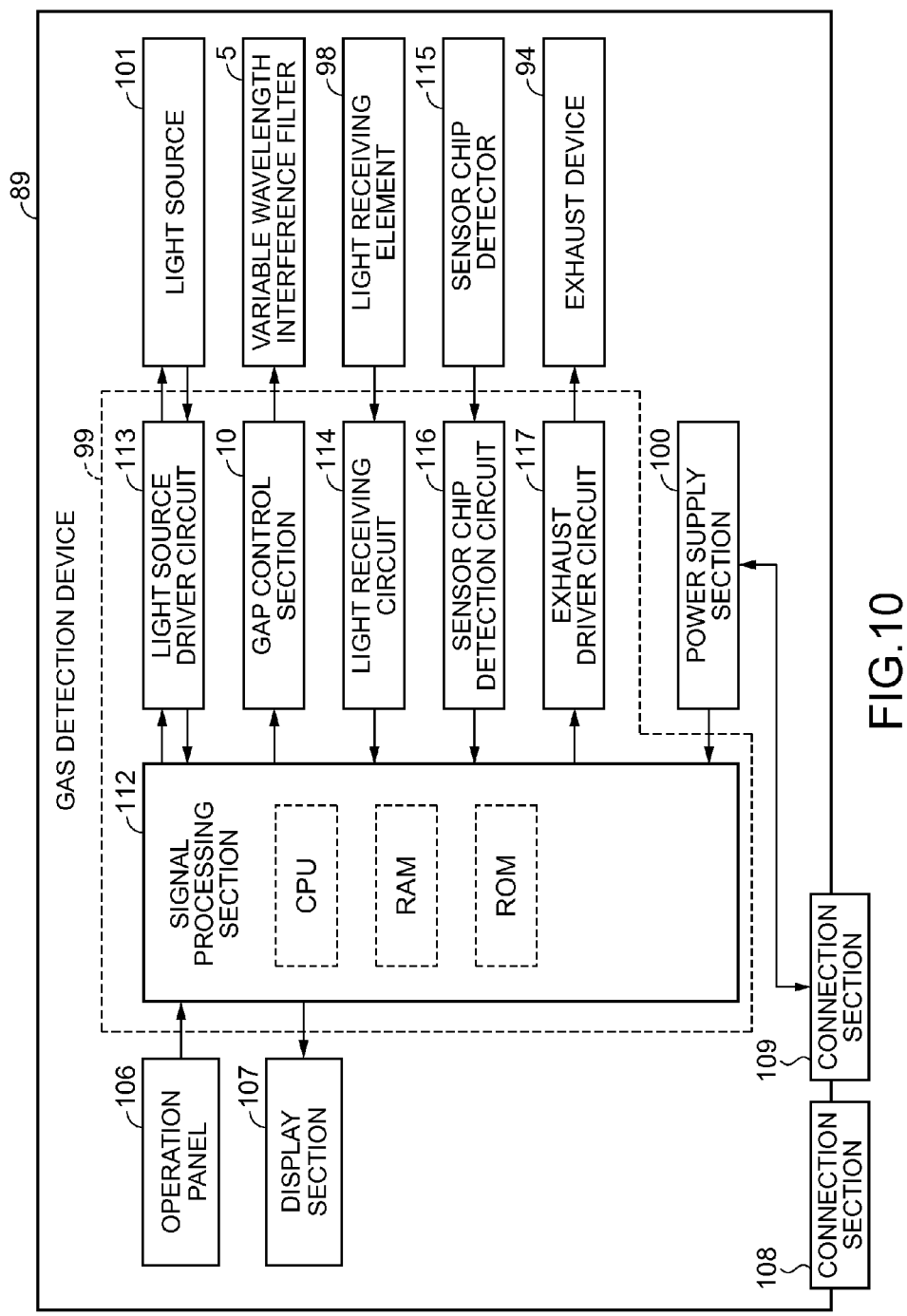
FIG. 10 is a block diagram showing a configuration of a control system of the gas detection device.

FIG. 9 is a schematic front view showing a configuration of the gap detection device, and FIG. 10 is a block diagram showing a configuration of a control system of the gas detection device. As shown in FIG. 9, the gas detection device 89 as an electronic apparatus is configured including a sensor chip 90, a channel 91 provided with a suction port 91*a*, a suction channel 91*b*, an exhaust channel 91*c*, and an exhaust port 91*d*, and a main body section 92.

The main body section 92 is provided with a sensor section cover 93 having an opening through which the channel 91 can detachably be attached, an exhaust device 94, and a housing 95. Further, the main body section 92 is provided with a detection device (the optical module) including an optical section 96, a filter 97, the variable wavelength interference filter 5, a light receiving element 98 (a detection section), and so on. Further, the main body section 92 is provided with a control section 99 (a processing section) for processing the signal thus detected and controlling the detection section, a power supply section 100 for supplying the electric power, and so on. It should be noted that it is also possible to adopt a configuration in which the optical filter device 61 is disposed instead of the variable wavelength interference filter 5. The optical section 96 is constituted by a light source 101 for emitting light, a beam splitter 102, a lens 103, a lens 104, and a lens 105. The beam splitter 102 reflects the light, which has been input from the light source 101, toward the sensor chip 90, and transmits the light, which has been input from the sensor chip side, toward the light receiving element 98.

As shown in FIG. 10, the gas detection device 89 is provided with an operation panel 106, a display section 107, a connection section 108 for an interface with the outside, and the power supply section 100. In the case in which the power supply section 100 is a secondary battery, a connection section 109 for the battery charge can also be provided. Further, the control section 99 of the gas detection device 89 is provided with a signal processing section 112 constituted by a CPU and so on, and a light source driver circuit 113 for controlling the light source 101. Further, the control section 99 is provided with the gap control section 10 for controlling the variable wavelength interference filter 5, and a light receiving circuit 114 for receiving the signal from the light receiving element 98. Further, the control section 99 is provided with a sensor chip detection circuit 116 for receiving a signal from a sensor chip detector 115 for retrieving the code of the sensor chip 90 to detect the presence or absence of the sensor chip 90. Further, the control section is provided with an exhaust driver circuit 117 for controlling the exhaust device 94, and so on.

Next, an operation of such a gas detection device 89 as described above will hereinafter be explained. The sensor chip detector 115 is disposed inside the sensor section cover 93 in an upper part of the main body section 92. The sensor chip detector 115 detects the presence or absence of the sensor chip 90. When detecting the detection signal from the sensor chip detector 115, the signal processing section 112 determines that the gas detection device 89 is in the state in which the sensor chip 90 is mounted to the gas detection device 89. Then, the signal processing section 112 outputs a display signal for displaying the fact that the detection operation can be performed to the display section 107.

Then, for example, the operation panel 106 is operated by the user, and an instruction signal instructing the commencement of the detection process is output from the operation panel 106 to the signal processing section 112. Firstly, the signal processing section 112 outputs an instruction signal for driving the light source to the light source driver circuit 113 to thereby make the light source 101 operate. When the light source 101 is driven, the light source 101 emits a stable laser beam, which has a single wavelength and is a linearly polarized light. The light source 101 incorporates a temperature sensor and a light intensity sensor, and the information of the sensors is output to the signal processing section 112. If the signal processing section 112 determines that the light source 101 is operating stably based on the information of the temperature and the light intensity input from the light source 101, the signal processing section 112 controls the exhaust driver circuit 117 to operate the exhaust device 94. Thus, the gaseous sample including the target material (the gas molecule) to be detected is guided from the suction port 91*a* to the suction channel 91*b*, the inside of the sensor chip 90, the exhaust channel 91*c*, and the exhaust port 91*d*. It should be noted that the suction port 91*a* is provided with a dust filter 91e, and relatively large dust, some water vapor, and so on are removed.

The sensor chip 90 is a sensor incorporating a plurality of sets of metal nano-structures, and using localized surface plasmon resonance. In such a sensor chip 90, an enhanced electric field is formed between the metal nanostructures due to the laser beam. When the gap molecule enters the enhanced electric field, Raman scattered light including the information of the molecular vibration and Rayleigh scattered light are generated. The Rayleigh scattered light and the Raman scattered light enter the filter 97 through the optical section 96. The Rayleigh scattered light is separated by the filter 97, and the Raman scattered light enters the variable wavelength interference filter 5.

Then, the signal processing section 112 outputs a control signal to the gap control section 10. Thus, the gap control section 10 drives actuator 33 of the variable wavelength interference filter 5 to make the variable wavelength interference filter 5 disperse the Raman scattered light corresponding to the gas molecules to be the detection target. When the light thus dispersed is received by the light receiving element 98, the light reception signal corresponding to the received light intensity is output to the signal processing section 112 via the light receiving circuit 114.

The variable wavelength interference filter 5 is capable of switching the electrical connection of the first reflecting film 18 and the second reflecting film 19. Therefore, since the electrostatic force acting between the first protective film 26 and the second protective film 27 can be removed, the distance between the first reflecting film 18 and the second reflecting film 19 can be maintained with high accuracy. As a result, since it is possible for the variable wavelength interference filter 5 to prevent the wavelength of the light to be transmitted from varying, it is possible for the variable wavelength interference filter 5 to accurately take out the intended Raman scattered light. The signal processing section 112 compares the spectrum data of the Raman scattered light corresponding to the gas molecules to be the detection target and thus obtained with the data stored in a ROM. Then, whether or not the gas molecules to be the detection target are the intended gas molecules is determined to identify the material. Further, the signal processing section 112 makes the display section 107 display the result information, and then outputs the result information from the connection section 108 to the outside.

There is described the example of the gas detection device 89 for dispersing the Raman scattered light with the variable wavelength interference filter 5, and then performing the gas detection based on the Raman scattered light thus dispersed. The gas detection device 89 can also be used as a gas detection device for detecting the absorbance unique to the gas to thereby identify the gas type. In this case, the gas is made to flow into the sensor, and the optical module 3 is used as the gas sensor for detecting the light absorbed by the gas out of the incident light. Further, the gas detection device is the electronic apparatus for analyzing and discriminating the gas flowing into the sensor using the gas sensor. By adopting such a configuration, it is possible for the gas detection device 89 to detect the component of the gas using the variable wavelength interference filter.

Food Analysis Device

Further, the system for detecting the presence of a specific material is not limited to such gas detection as described above. There can be cited a substance component analysis device such as a non-invasive measurement device of a sugar group using near-infrared dispersion, and a non-invasive measurement device of information of food, biological object, or mineral. Hereinafter, a food analysis device will be explained as an example of the substance component analysis device.

Figure 11:
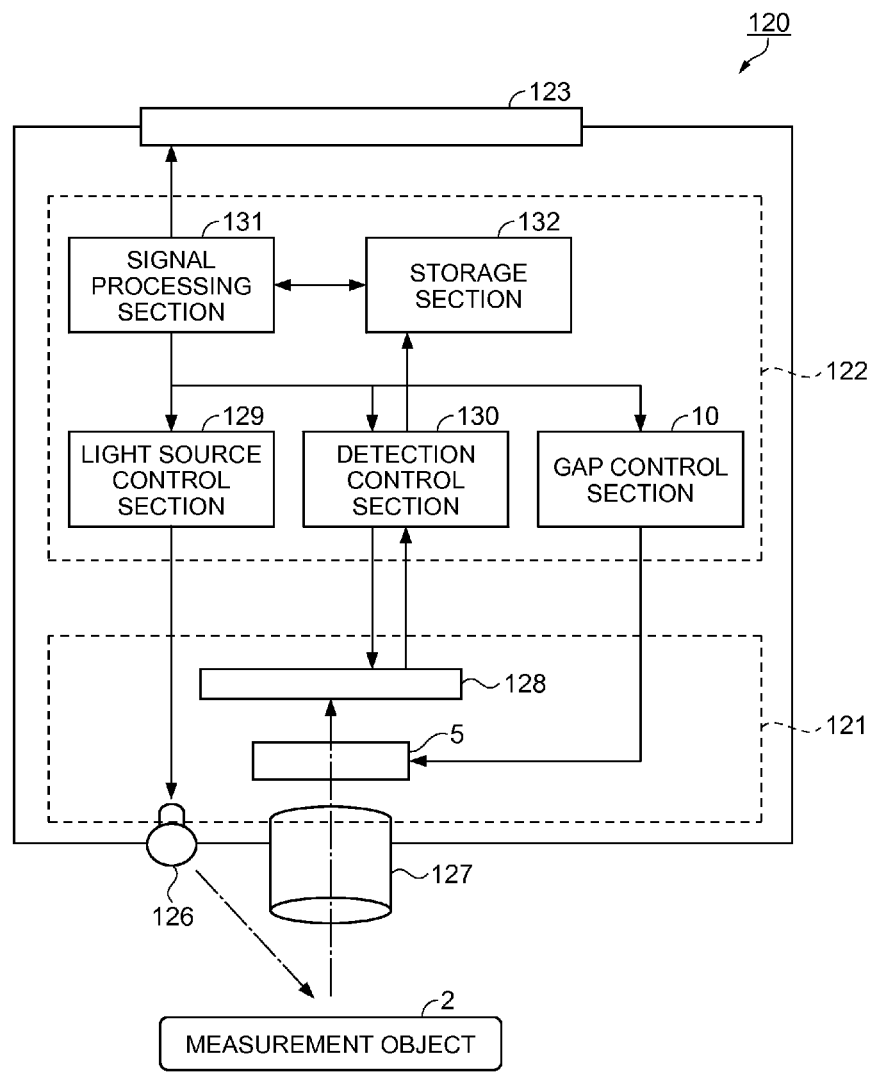
FIG. 11 is a block diagram showing a configuration of a food analysis device.

FIG. 11 is a block diagram showing a configuration of the food analysis device. As shown in FIG. 11, the food analysis device 120 as the electronic apparatus is provided with a detector 121 (the optical module), a control section 122, and a display section 123. The detector 121 is provided with a light source 126 for emitting light, an image pickup lens 127 to which the light from a measurement object is introduced, and the variable wavelength interference filter 5 for dispersing the light thus introduced from the image pickup lens 127. Further, the detector 121 is provided with an imaging section 128 (a detection section) for detecting the light thus dispersed. It should be noted that it is also possible to adopt a configuration in which the optical filter device 61 is disposed instead of the variable wavelength interference filter 5. Further, the control section 122 is provided with a light source control section 129 for performing lighting/extinction control of the light source 126, and brightness control when lighting, and the gap control section 10 for controlling the variable wavelength interference filter 5. Further, the control section 122 is provided with a detection control section 130 for controlling the imaging section 128 to obtain the spectral image imaged by the imaging section 128, a signal processing section 131, and a storage section 132.

When driving the food analysis device 120, the light source control section 129 controls the light source 126, and the measurement object 2 is irradiated with the light from the light source 126. Then, the light reflected by the measurement object 2 passes through the image pickup lens 127 and then enters the variable wavelength interference filter 5. The variable wavelength interference filter 5 is driven under the control by the gap control section 10. Thus, the light with the target wavelength can accurately be taken out from the variable wavelength interference filter 5. Then, the light thus taken out is imaged by the imaging section 128 formed of, for example, a CCD camera. Further, the light thus imaged is stored in the storage section 132 as the spectral image. Further, the signal processing section 131 controls the gap control section 10 to vary the voltage value to be applied to the variable wavelength interference filter 5 to thereby obtain the spectral image corresponding to each wavelength.

Then, the signal processing section 131 performs an arithmetic process on the data of each pixel in each of the images stored in the storage section 132 to thereby obtain the spectrum in each pixel. Further, storage section 132 stores the information related to the components of the food corresponding to the spectrum. Based on the information related to the food stored in the storage section 132, the signal processing section 131 analyzes the data of the spectrum thus obtained. Then, the signal processing section 131 obtains the food components included in the measurement object 2 and the content of each of the food components. Further, the calorie of the food, the freshness thereof, and so on can also be calculated based on the food components and the contents thus obtained. Further, by analyzing the spectrum distribution in the image, it is possible for the signal processing section 131 to perform extraction of the portion deteriorated in freshness out of the test target food, and so on. Further, it is also possible for the signal processing section 131 to even detect a foreign matter or the like included in the food. Then, the signal processing section 131 performs a process of making the display section 123 display the information of the components, the contents, the calorie, the freshness, and so on of the food as the test object obtained in such a manner as described above.

The variable wavelength interference filter 5 is capable of switching the electrical connection of the first reflecting film 18 and the second reflecting film 19. Therefore, since the electrostatic force acting between the first protective film 26 and the second protective film 27 can be removed, the distance between the first reflecting film 18 and the second reflecting film 19 can be maintained with high accuracy. As a result, since it is possible for the variable wavelength interference filter 5 to prevent the wavelength of the light to be transmitted from varying, it is possible for the food analysis device 120 to measure the wavelength of the measurement object 2 with high accuracy.

Further, besides the food analysis device 120, it is also possible to use roughly the same configuration as such a non-invasive measurement device of other information as described above. For example, the configuration can be used as a biological analysis device for performing analysis of a biological component such as measurement and analysis of a biological fluid such as blood. As such a biological analysis device, the food analysis device 120 can be used for a device for measuring a biological fluid such as blood. In addition, by applying the configuration to a device for detecting ethyl alcohol, the food analysis device 120 can be used for a drunk driving prevention device for detecting the influence of alcohol to the driver of a vehicle. Further, the configuration can also be used as an electronic endoscopic system equipped with such a biological analysis device. Further, the configuration can also be used as a mineral analysis device for performing component analysis of minerals.

Further, as the electronic apparatus using the optical module 3, the invention can be applied to the following devices. For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter 5 provided to the optical module 3, and then making the light receiving section receive the light. Therefore, by processing the data in the light having each of the wavelengths using the electronic apparatus equipped with such a data extracting optical module, it is also possible to perform optical communication.

Spectroscopic Camera

Figure 12:
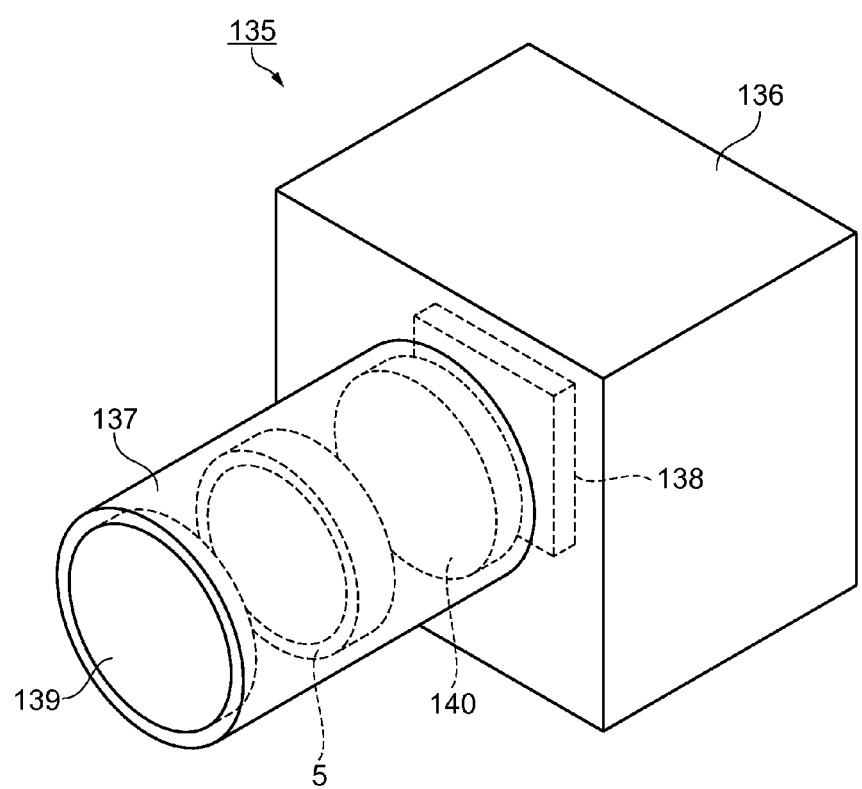
FIG. 12 is a schematic perspective view showing a configuration of a spectroscopic camera.

Further, as the electronic apparatus, the optical module 3 can be applied to a spectroscopic camera for dispersing the light using the optical module 3 to take the spectral image, a spectroscopic analysis device, and so on. As an example of such a spectroscopic camera, an infrared camera incorporating the variable wavelength interference filter 5 can be cited. FIG. 12 is a perspective view showing a configuration of the spectroscopic camera. As shown in FIG. 12, the spectroscopic camera 135 as an electronic apparatus is provided with a camera main body 136, an image pickup lens unit 137, and an imaging section 138. The camera main body 136 is a part to be gripped and operated by the user.

The image pickup lens unit 137 is provided to the camera main body 136, and guides the image light input thereto to the imaging section 138. Further, the image pickup lens unit 137 is configured including an objective lens 139, an image forming lens 140, and the variable wavelength interference filter 5 disposed between these lenses. The imaging section 138 is formed of a light receiving element, and takes the image of the image light guided by the image pickup lens unit 137. In such a spectroscopic camera 135, the variable wavelength interference filter 5 transmits the light with the wavelength to be the imaging object, and the imaging section 138 takes the spectral image of the light with a desired wavelength. The variable wavelength interference filter 5 is capable of switching the electrical connection of the first reflecting film 18 and the second reflecting film 19. Therefore, since the electrostatic force acting between the first protective film 26 and the second protective film 27 can be removed, the distance between the first reflecting film 18 and the second reflecting film 19 can be maintained with high accuracy. As a result, since it is possible for the variable wavelength interference filter 5 to prevent the wavelength of the light to be transmitted from varying, it is possible for the spectroscopic camera 135 to take the spectral image of the light with an intended wavelength with high accuracy.

Further, the optical module 3 can also be used as a band-pass filter, and can also be used as, for example, an optical laser device for dispersing and transmitting only the light with a wavelength in a narrow band centered on a predetermined wavelength out of the light in a predetermined wavelength band emitted by the light emitting element using the variable wavelength interference filter 5. Further, the optical module 3 can also be used as a biometric authentication device, and can be applied to, for example, an authentication device of blood vessels, a fingerprint, a retina, an iris, and so on using the light in a near infrared range or the visible range. Further, the optical module 3 can be used as a concentration detection device. In this case, the infrared energy (the infrared light) emitted from the substance is dispersed by the variable wavelength interference filter 5 and is then analyzed, and the concentration of the test object in a sample is measured.

As described above, the optical module 3 can be applied to any device for dispersing predetermined light from the incident light. Further, since the optical module 3 can disperse the light into a plurality of wavelengths with the single optical module 3 as described above, the measurement of the spectrum of a plurality of wavelengths and detection of a plurality of components can be performed with accuracy. Therefore, compared to the related-art device of taking out desired wavelengths with a plurality of devices, miniaturization of the optical module 3 and the electronic apparatus can be promoted, and the optical module 3 and the electronic apparatus can preferably be used as, for example, a portable or in-car optical device.

It should be noted that the present embodiment is not limited to the embodiments described above, but various modifications or improvements can also be added by those skilled in the art within the technical concept of the invention. Some modified examples will be described below.

MODIFIED EXAMPLE 1

In the first embodiment, indium gallium oxide (InGaO) is used as the material of the first protective film 26 and the second protective film 27. It is also possible to use indium gallium oxide (InGaO) for the first protective film 26 while using other materials as the material of the second protective film 27. It is also possible to use indium gallium oxide (InGaO) for the second protective film 27 while using other materials as the material of the first protective film 26. Setting suitable qualities of the materials of the first reflecting film 18 and the second reflecting film 19 is also possible.

MODIFIED EXAMPLE 2

In the first embodiment, there is adopted the configuration in which the side surfaces of both of the first reflecting film 18 and the second reflecting film 19 are exposed. It is also possible to adopt a configuration in which the side surface of the first reflecting film 18 is exposed while the side surface of the second reflecting film 19 is covered with the second protective film 27. It is also possible to adopt a configuration in which the side surface of the second reflecting film 19 is exposed while the side surface of the first reflecting film 18 is covered with the first protective film 26. Setting suitable configurations for the manufacturing process is also possible.

MODIFIED EXAMPLE 3

In the first embodiment described above, the second wiring line 30 and the second terminal 32 are connected by the resin bump 31. The second wiring line 30 and the second terminal 32 can also be connected to each other using other methods. It is also possible to make an electrode connected to the second wiring line 30 and an electrode connected to the second terminal 32 have surface contact with each other. The second wiring line 41 and the fourth terminal 43 are connected via the resin bump 42. Similarly to the resin bump 31, the second wiring line 41 and the fourth terminal 43 can also be connected to each other using other methods. It is also possible to make an electrode connected to the second wiring line 41 and an electrode connected to the fourth terminal 43 have surface contact with each other.

As the material of the electrodes made to have surface contact with each other, a material low in electric resistance is more preferable. This is because the contact resistance of the parts made to have surface contact with each other can be reduced, intervention of unwanted resistance component can be eliminated, and reliable electrical connection can be achieved. As such a material low in electric resistance, there can be selected a metal film made of Au or the like, a metal laminated body made of Au/Cr or the like, or a material having a configuration of stacking a metal material such as Au or a metal laminated body made of Au/Cr on a surface of a metal oxide such as ITO. It should be noted that it is also possible to adopt a configuration of stacking a metal film or a metal laminated film on the electrode made of a metal oxide such as ITO locally around the area having surface contact described above.

The entire disclosure of Japanese Patent Application No. 2013-163945 filed on Aug. 7, 2013 is expressly incorporated by reference herein.

What is claimed is:
1. An optical filter comprising:
a first reflecting film;
a second reflecting film opposed to the first reflecting film;
a first electrically conductive film disposed directly on a first surface of the first reflecting film, the first surface being overlappingly opposed to the second reflecting film, and having a light transmissive property and electrical conductivity;
a second electrically conductive film disposed directly on a second surface of the second reflecting film, the second surface being overlappingly opposed to the first reflecting film, and having a light transmissive property and electrical conductivity;
a first terminal electrically connected to the first conductive film; and
a second terminal electrically connected to the second conductive film,
wherein an electrically connected state of each of the first terminal and the second terminal is switchable; and the first reflecting film and the second reflecting film are provided with:
an effective range area irradiated with light, and
an auxiliary range area not irradiated with the light, and the auxiliary range area surrounds the effective range area.
2. The optical filter according to claim 1, wherein
the first reflecting film and the second reflecting film each include silver, and
at least one of the first conductive film and the second conductive film primarily contains InGaO.
3. The optical filter according to claim 1, wherein
at least one of the first reflecting film and the second reflecting film has an exposed side surface.
4. The optical filter according to claim 1, wherein
a capacitance between the first conductive film and the second conductive film is detected using the first terminal and the second terminal.
5. The optical filter according to claim 1, wherein
the electrically connected state of each of the first terminal and the second terminal includes:
a grounded state; and
a capacitance detecting state.
6. An optical module comprising:
a first reflecting film;
a second reflecting film opposed to the first reflecting film;
a first electrically conductive film disposed directly on a first surface of the first reflecting film, the first surface being overlappingly opposed to the second reflecting film, and having a light transmissive property and an electrical conductivity;
a second electrically conductive film disposed directly on a second surface of the second reflecting film, the second surface being overlappingly opposed to the first reflecting film, and having a light transmissive property and an electrical conductivity; and
an electric switch adapted to switch an electrically connected state of each of the first conductive film and the second conductive film,
wherein the first reflecting film and the second reflecting film are provided with:
an effective range area irradiated with light, and
an auxiliary range area not irradiated with the light, and the auxiliary range area surrounds the effective range area.
7. The optical module according to claim 6, further comprising:
a capacitance detector adapted to detect a capacitance between the first conductive film and the second conductive film.
8. The optical filter according to claim 6, wherein
the electrically connected state of each of the first conductive film and the second conductive film includes:
a grounded state; and
a capacitance detecting state.
9. An electronic apparatus, comprising:
the optical module according to claim 6; and
a controller adapted to control the optical module.
10. An optical filter comprising: a first substrate; a second substrate; a first reflector disposed on the first substrate; a second reflector that is formed on the second substrate and opposed to the first reflector; a first conductor that transmits light and that is disposed on the first reflector; and a second conductor that transmits light and that is disposed on the second reflector, wherein the first reflector includes a first effective area that has a first reflectance, and a first auxiliary area that has a second reflectance, the second reflectance being lower than the first reflectance, and the first auxiliary area being located outboard of the first effective area, the second reflector includes a second effective area that has a third reflectance, and a second auxiliary area that has a fourth reflectance, the fourth reflectance being lower than the third reflectance, and the second auxiliary area being located outboard of the second effective area, an electrically connected state of each of the first conductor and the second conductor is switchable.

11. The optical filter according to claim 10, wherein the electrically connected state includes a ground state and a capacitance detecting state.

12. An optical module comprising the optical filter according to claim 10.

13. An electronic apparatus comprising:
the optical module according to claim 12, and
a controller configured to control the optical module.

* * * * *